US012174284B2

(12) United States Patent
Peterson et al.

(10) Patent No.: US 12,174,284 B2
(45) Date of Patent: Dec. 24, 2024

(54) TRANSMISSION OF SIGNALS FOR RANGING, TIMING, AND DATA TRANSFER

(71) Applicant: Microchip Technology Incorporated, Chandler, AZ (US)

(72) Inventors: Benjamin Peterson, Waterford, CT (US); Richard Stuart Foster, Louisville, CO (US); Jeremy Dean Warriner, Longmont, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 394 days.

(21) Appl. No.: 17/447,392

(22) Filed: Sep. 10, 2021

(65) Prior Publication Data
US 2022/0120838 A1    Apr. 21, 2022

Related U.S. Application Data

(60) Provisional application No. 63/198,476, filed on Oct. 21, 2020.

(51) Int. Cl.
*G01S 1/04* (2006.01)

(52) U.S. Cl.
CPC .................... *G01S 1/0428* (2019.08)

(58) Field of Classification Search
CPC .................. G01S 1/24–28; G01S 1/042–0428
See application file for complete search history.

(56) References Cited

U.S. PATENT DOCUMENTS

| | | | | |
|---|---|---|---|---|
| 3,870,999 A | * | 3/1975 | Mathews | G01S 1/24 342/389 |
| 4,275,398 A | | 6/1981 | Parker | |
| 4,594,594 A | * | 6/1986 | Fukuhara | G01S 1/245 342/389 |
| 10,778,362 B2 | | 9/2020 | Mason | |

(Continued)

FOREIGN PATENT DOCUMENTS

| | | |
|---|---|---|
| EP | 0315377 A2 | 5/1989 |
| WO | 2018/044834 A1 | 3/2018 |
| WO | 2022/087553 A1 | 4/2022 |

OTHER PUBLICATIONS

Peterson et al., "High Speed Loran-C Data Communications—Flight Test Results", Proceedings of the ION-GPS 2001, Salt Lake City, Sep. 2001, pp. 1919-1932.

(Continued)

*Primary Examiner* — Cassi J Galt
(74) *Attorney, Agent, or Firm* — TraskBritt

(57) ABSTRACT

A method is disclosed. In various examples, the method may include receiving an instruction for generating a ranging signal, and transmitting the ranging signal at least partially responsive to the instruction. In various examples the ranging signal may be transmitted via a terrestrial transmitter for transmitting radio waves having encoded messaging information and timing information for one or more of positioning, navigation and timing. In various examples, the ranging signal may exhibit a first ranging pulse and a second ranging pulse of a pulse group and an encoded transmitter identifier, the transmitter identifier encoded by modulating an inter-pulse interval defined between a start of the first ranging pulse and a start of the second ranging pulse.

10 Claims, 14 Drawing Sheets

| | | | | | | | | | | | | |
|---|---|---|---|---|---|---|---|---|---|---|---|---|
| GRI1: | 0 | 2 | 2 | 1 | 2 | 2 | 0 | 2 | 2 | 1 | 2 | 2 |
| GRI2: | 1 | 2 | 2 | 0 | 2 | 2 | 1 | 2 | 2 | 0 | 2 | 1 |
| GRI3: | 2 | 2 | 1 | 2 | 2 | 1 | 0 | 2 | 2 | 1 | 2 | 2 |
| GRI4: | 0 | 2 | 2 | 1 | 2 | 2 | 1 | 2 | 2 | 0 | 2 | 2 |
| GRI5: | 1 | 2 | 2 | 0 | 2 | 1 | 2 | 2 | 1 | 2 | 2 | 1 |
| GRI6: | 0 | 2 | 2 | 1 | 2 | 2 | 0 | 2 | 2 | 1 | 2 | 2 |
| GRI7: | 1 | 2 | 2 | 0 | 2 | 2 | 1 | 2 | 2 | 0 | 2 | 1 |
| GRI8: | 2 | 2 | 1 | 2 | 2 | 1 | 0 | 2 | 2 | 1 | 2 | 2 |
| GRI9: | 0 | 2 | 2 | 1 | 2 | 2 | 1 | 2 | 2 | 0 | 2 | 2 |
| GRI10: | 1 | 2 | 2 | 0 | 2 | 1 | 2 | 2 | 1 | 2 | 2 | 1 |

0 = 16 Template Pulses
1 = 28 Time Message Pulses
2 = 76 Data Message Pulses

(56) References Cited

U.S. PATENT DOCUMENTS

| | | | |
|---|---|---|---|
| 2018/0356529 A1 | 12/2018 | Lee et al. | |
| 2019/0377055 A1* | 12/2019 | Offermans | H04W 12/04 |
| 2020/0326419 A1* | 10/2020 | Parsche | G01S 19/11 |

OTHER PUBLICATIONS

Peterson et al., "High Speed Loran-C Data Communications", Proceedings of the 2nd International Symposium on Integration of Loran-C/Eurofix and Egnos/Galileo, Bonn, Germany, Feb. 2001, pp. 135-157.

Peterson et al., "WAAS messages via LORAN Data Communications—Technical progress towards going operational", Proceedings of Institute of Navigation National Technical Meeting, San Diego, CA, Jan. 2002, pp. 138-145.

International Invitation to Pay Additional Fees from International Application No. PCT/US2021/071429, mailed Mar. 18, 2022, 12 pages.

International Search Report from International Application No. PCT/US2021/071429, mailed May 11, 2022, 6 pages.

International Written Opinion from International Application No. PCT/US2021/071429, mailed May 11, 2022, 10 pages.

Lo et al., "Assessing the Loran Cycle Confidence Algorithm," Proceedings of the International Loran Association 35th Annual Meeting, Groton, CT, (Oct. 2006), 19 pages.

Lo et al., "Broadcasting Data from an SBAS Reference Network over Low Rate Broadcast Channels", (2000), pp. 199-209.

Lo et al., "Defining Primary, Secondary, Additional Secondary Factors for RTCM Minimum Performance Specifications (MPS)," (2009), 9 pages.

Lo et al., "Enhanced Loran," (No Date), 70 pages.

Lo et al., "Loran Coverage Availability Simulation Tool," (2008), 11 pages.

Lo et al., "Loran Data Modulation: A Primer," IEEE Aerospace and Electronic Systems Magazine, vol. 22, Issue 9, (Sep. 2007), pp. 31-51.

Lo et al., "Loran Data Modulation: Extensions and Examples," IEEE Transactions on Aerospace and Electronic Systems, vol. 43, Issue 2, (Apr. 2007), pp. 628-644.

Lo et al., "Proving the Integrity of the Weighted Sum Squared Error (WSSE) Loran Cycle Confidence Algorithm," Annual of Navigation, vol. 54 (2007), pp. 277-291.

Lo et al., "Using Loran for Broadcast of Integrity Information for Modernized Global Navigation Satellite Systems (GNSS)," (2008), 10 pages.

Peterson et al., "Differential LORAN-C," (2004), 21 pages.

Peterson et al., "Enhanced Loran-C Data Channel Project", International Symposium on Integration of Loran-C/Eurofix Andegnos/Galileo, XP002224777, (Mar. 22, 2000) pp. 1-13, p. 7, left-hand-column, first paragraph.

Peterson et al., "Improving Loran Coverage with Low Power Transmitters," Journal of Navigation, vol. 63, (2010), pp. 23-38.

Peterson et al., "Integrating Loran and GNSS for Safety of Life Applications," Proceedings of the 21st International Technical Meeting of the Satellite Division of The Institute of Navigation, (2008), pp. 1619-1630.

* cited by examiner

| | | | | | | | | | | | | |
|---|---|---|---|---|---|---|---|---|---|---|---|---|
| GRI1: | 0 | 2 | 2 | 1 | 2 | 2 | 0 | 2 | 2 | 1 | 2 | 2 |
| GRI2: | 1 | 2 | 2 | 0 | 2 | 2 | 1 | 2 | 2 | 0 | 2 | 1 |
| GRI3: | 2 | 2 | 1 | 2 | 2 | 2 | 0 | 2 | 2 | 1 | 2 | 2 |
| GRI4: | 0 | 2 | 2 | 1 | 2 | 2 | 1 | 2 | 2 | 0 | 2 | 2 |
| GRI5: | 1 | 2 | 2 | 0 | 2 | 2 | 2 | 2 | 1 | 1 | 2 | 1 |
| GRI6: | 0 | 2 | 2 | 1 | 2 | 2 | 0 | 2 | 2 | 0 | 2 | 2 |
| GRI7: | 1 | 2 | 1 | 0 | 2 | 2 | 1 | 2 | 2 | 1 | 2 | 1 |
| GRI8: | 2 | 2 | 2 | 1 | 2 | 2 | 0 | 2 | 2 | 0 | 2 | 2 |
| GRI9: | 0 | 2 | 2 | 0 | 2 | 2 | 1 | 2 | 2 | 1 | 2 | 2 |
| GRI10: | 1 | 2 | 2 | 2 | 2 | 1 | 2 | 2 | 2 | 2 | 2 | 1 |

0 = 16 Template Pulses
1 = 28 Time Message Pulses
2 = 76 Data Message Pulses

DURING A BROADCAST CYCLE OF A TERRESTRIAL TRANSMITTER FOR TRANSMITTING RADIO WAVES HAVING ENCODED MESSAGING INFORMATION AND TIMING INFORMATION FOR ONE OR MORE OF POSITIONING, NAVIGATION AND TIMING, TRANSMITTING PULSE GROUPS OF THE BROADCAST CYCLE, VIA THE TERRESTRIAL TRANSMITTER, RESPECTIVE ONES OF THE PULSE GROUPS INCLUDING A NUMBER OF RANGING PULSES, RESPECTIVE ONES OF THE NUMBER OF RANGING PULSES HAVING A PHASE OF EITHER A POSITIVE-GOING PHASE OR A NEGATIVE-GOING PHASE, WHEREIN THE PHASES OF RESPECTIVE ONES OF THE RANGING PULSES OF THE RESPECTIVE PULSE GROUP ARE ACCORDING TO A PULSE-PHASE SIGNATURE AND THE PULSE-PHASE SIGNATURE IS PREDEFINED FOR THE BROADCAST CYCLE AND THE TERRESTRIAL TRANSMITTER 1302

FIG. 13

TRANSMISSION OF SIGNALS FOR RANGING, TIMING, AND DATA TRANSFER

CROSS-REFERENCE TO RELATED APPLICATIONS

This application claims the benefit under 35 U.S.C. § 119(e) of U.S. Provisional Patent Application Ser. No. 63/198,476, filed Oct. 21, 2020, entitled "PRIVATIZED AND SECURED LOW FREQUENCY SIGNALING FOR POSITIONING, NAVIGATION AND TIMING AND ONE-WAY MESSAGING," the disclosure of which is hereby incorporated herein in its entirety by this reference.

BACKGROUND

Transmitters of radio waves (e.g., ground based radio waves) are sometimes used to broadcast signals for positioning, navigation, or timing. An example system for transmitting such signals is Long-Range Navigation (LORAN) and variations thereon.

BRIEF DESCRIPTION OF THE DRAWINGS

The purpose and advantages of the examples of the present disclosure will be apparent to one of skill in the art from the detailed description in conjunction with the following appended drawings.

FIG. 2 illustrates a pulse-ordering scheme according to one or more examples.

FIG. 13 is a flowchart illustrating a method for broadcasting radio waves (e.g., radio frequency groundwaves) according to one or more examples.

DETAILED DESCRIPTION

Figure 1A:
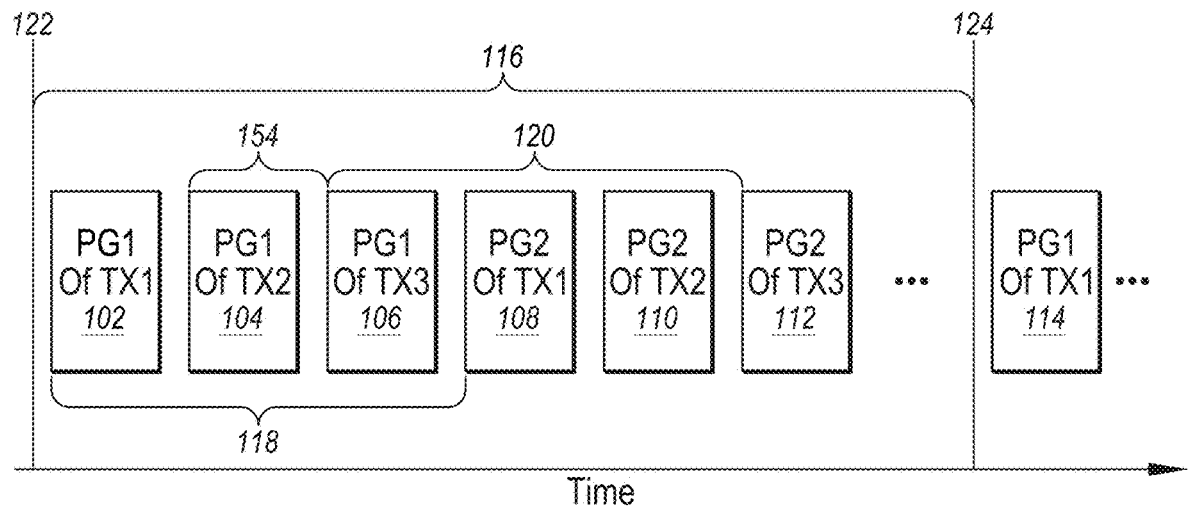
FIG. 1A illustrates example pulse groups of an example epoch according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a collection of signals, wherein the collection may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Long Range Navigation (LORAN or just "Loran") signals, developed in the 1950's, are ranging signals of broadcast radio frequency (RF) groundwaves at low frequencies, typically between 90 and 110 kilohertz (kHz), that can be used for positioning, navigation, and/or timing ("PNT"). Such ranging signals can travel more than 1000 miles, through air, structures, earth, and water and can be up to 10,000 times more powerful than, as a non-limiting example, Global Positioning System (GPS) signals. Loran technology (and more specifically, an intermediate technology called "Loran-C") was upgraded in the 1990's resulting in enhanced Loran ("eLoran") navigation systems. ELoran navigation systems, among other things, included transmitter sites synchronized to Coordinated Universal Time (UTC), use of Time of Transmission (TOT) control rather than System Area Monitor (SAM) control used by Loran navigation systems, addition of a Loran Data Channel (LDC) to a ranging signal to provide time, improved positioning accuracy, and increased integrity.

A typical broadcast of eLoran type ranging signal is a pulse train of eLoran type configured pulses of oscillating signals. A pulse envelope of each pulse includes a leading edge that begins at a first point of rest (i.e., zero or negligible energy of the oscillating signal) and rises until it reaches a point of maximum amplitude (the "peak" of the pulse), and a tail edge that begins at the peak and falls until it reaches a second point of rest. In a standard eLoran pulse, a portion of the pulse defined substantially during part of the leading edge is used for phase tracking (in standard eLoran, typically the sixth zero crossing by the oscillating signal) to encode timing information into a pulse and more specifically for PNT. A receiver may use a positioning technique (including, as non-limiting examples, multilateration position estimation, or hyperbolic position estimation calculations) to recover PNT information based on received eLoran-type ranging signals. Additionally, in some cases eLoran signals may be used to encode data.

Transmitters in a standard eLoran configuration known to the inventors of this disclosure may be located hundreds and sometimes over a thousand miles apart. Each transmitter may stand hundreds of feet tall (e.g., 625 feet above local ground level).

Notwithstanding the opportunities in eLoran, funding for implementation of an eLoran navigation system was reduced in the United States of America in favor of GPS systems in the 2010's and, only several transmitter towers remain standing today.

The inventors of this disclosure appreciate, generally, an over-dependence on GPS for PNT. The availability of inexpensive GPS jammers and signal spoofers raises vulnerability concerns, especially for critical infrastructure, key resources, and safety-of-life applications. Accordingly, there is recognition by industry and government entities of a need for a complement/back-up navigation system for GPS—if not, in some environments or for some applications, a replacement.

To provide a suitable backup or replacement for GPS, the inventors of this disclosure appreciate a need for: access control for eLoran PNT services; support for different levels of PNT service; increased data transfer rate (as compared to conventional eLoran) to provide additional, one-way (i.e., unidirectional) communication capability; and improved immunity to jamming and spoofing attacks.

One or more examples relate, generally, to encoding information indicative of a specific transmitter in a pulse group of a ranging signal.

Additionally or alternatively, one or more examples relate, generally, to arranging information transmissions to decrease the impact of burst errors at a receiver, and in various examples more specifically, according to an algorithm selected to improve the efficacy of forward error correction (FEC) techniques including those that use Reed-Solomon FEC blocks for error correction.

Additionally or alternatively, one or more examples relate, generally, to transmitting ranging signals according to a pulse-phase-signature schedule known to certain recipients of the signal. As a non-limiting example, transmitting ranging signals according to the pulse-phase-signature schedule may counter attempts to spoof a ranging signal.

While examples may be discussed herein in the context of eLoran PNT systems, a person having ordinary skill in the art will appreciate that this is just an example of an environment in which disclosed examples may be deployed and implemented; and use with other environments do not exceed the scope of this disclosure.

As used herein, the term "ranging signal" means a signal provided (e.g., broadcast) by a transmitter that may be useable to determine PNT information. Additionally, as used herein a "ranging signal" may be used for messaging.

As used herein, the term "pulse group" means two or more signal pulses generated by a same transmitter. A signal pulse of a ranging signal (also referred to herein as a "ranging pulse") is a non-limiting example of a signal pulse of a pulse group.

As used herein, "inter-pulse interval" means a duration of time defined between the start (i.e., starting time) of successive pulses of a pulse group.

As used herein, "group repetition interval" means a duration of time defined between the start (i.e., starting time) of successive pulse groups from the same transmitter.

As used herein, the term "broadcast cycle" means two or more pulse groups not necessarily generated by a same transmitter. An epoch is a non-limiting example of a broadcast cycle. Herein, the duration of a broadcast cycle may sometimes also be referred to herein as a "broadcast cycle." A number of pulse groups per broadcast cycle will typically be defined in a specification. As a non-limiting example, in an eLoran-based system, the number of pulse groups per broadcast cycle may be defined based on a number of desired bits for a message. In such a case, the number of pulse-groups per broadcast cycle is defined as the number of pulse groups for a desired bits for a message.

FIG. 1A illustrates example pulse groups of an example epoch 116 of a ranging signal according to one or more examples. In particular, FIG. 1A illustrates two pulse groups (PGs) of three different transmitters (TXs) in epoch 116. More specifically, FIG. 1A illustrates a first pulse group of a first transmitter, PG1 of TX1 102, a first pulse group of a second transmitter, PG1 of TX2 104, a first pulse group of a third transmitter PG1 of TX3 106, a second pulse group of the first transmitter, PG2 of TX1 108, a second pulse group of the second transmitter, PG2 of TX2 110, and a second pulse group of the third transmitter, PG2 of TX3 112. Additionally, FIG. 1A illustrates a first pulse group of a second epoch, PG1 of TX1 114. Although epoch 116 is illustrated as including two pulse groups from each of three transmitters, an epoch may include any number of pulse groups from any number of transmitters.

A duration of an epoch 116 generally corresponds to a time during which pulse groups (e.g., PG1 of TX1 102, PG1 of TX2 104, PG1 of TX3 106, PG2 of TX1 108, PG2 of TX2 110, PG2 of TX3 112, and additional pulse groups (e.g., from the first, second, and third transmitters)) may be/are transmitted. The duration of an epoch, such as epoch 116, may be related to a desired number of pulse groups per epoch, and a number of transmitters per geographical area or group of transmitters (which may be referred to in the art as a "chain"). As illustrated by FIG. 1A, epoch 116 is defined by a "beginning" at a start 122 of epoch 116 (or by a nominal start time as discussed below) and an "ending" at a start of a second epoch 124 (or by a nominal start of a next epoch as discussed below). An end of an epoch corresponds to a start of a subsequent epoch, and so on and so forth.

FIG. 1A illustrates two example group repetition intervals: TX1 group repetition interval 118 is defined between the start of a first pulse group of a first transmitter (e.g., PG1 of TX1 102) and the start of a second pulse group of the first transmitter (e.g., PG2 of TX1 108). TX3 group repetition interval 120 is defined between the start of a first pulse group of a third transmitter (e.g., PG1 of TX3 106) and the start of a second pulse group of the third transmitter (e.g., PG2 of TX3 112).

FIG. 1A illustrates one nominal emission delay 154, i.e., a duration of time between the start of a first pulse group and the start of an immediately following pulse group, which may be of a different transmitter. For example, nominal emission delay 154 is the duration of time between the start of PG1 of TX2 and the start of PG1 of TX3.

Notably, any suitable markers may be used to define a group repetition interval or a nominal emission delay without exceeding the scope of this disclosure, such as peaks, beginning of leading edges, pre-specified zero crossings, or combinations thereof, without limitation. As non-limiting examples, peaks of first or last pulses of the respective pulse groups, a beginning of a leading edge of the first or last pulses of the respective pulse groups, pre-specified zero-crossings of oscillating signals of the first or last pulses of the respective pulse groups, and combinations thereof, may be used to define the group repetition interval or the nominal emission delay. Unless otherwise stated, the marker used to define intervals in examples is the beginning of the leading edge of the pulses of interest. In some cases, an end of a tail edge may not be used as a marker because the tail may ring out.

Figure 1B:
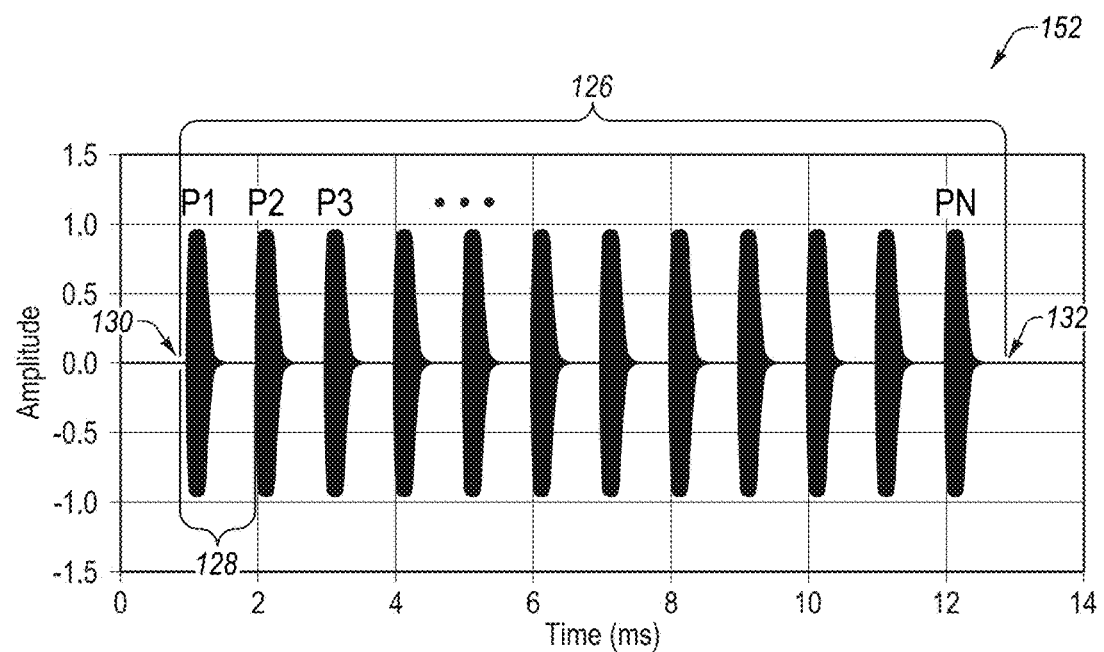
FIG. 1B illustrates example pulses within an example pulse group according to one or more examples.

FIG. 1B illustrates ranging pulses P1 to PN of a pulse group 152 of a ranging signal, in accordance with one or more examples. In one or more examples, the respective inter-pulse intervals utilized by various transmitters may be different and so a respective inter-pulse interval may be used to identify a transmitter that transmitted a respective pulse group. Inter-pulse interval 128 encodes a transmitter identifier into pulse group 152.

FIG. 1B illustrates pulses that may be part of any of the pulse groups discussed herein, such as illustrated in FIG. 1A, without limitation. This disclosure is not limited to the shapes of the pulse envelopes of P1 to PN illustrated by FIG. 1B. Use of other shapes of pulse envelopes, such as the shape of the pulse envelope depicted by FIG. 1C, without limitation, are specifically contemplated and do not exceed the scope of this disclosure.

FIG. 1B illustrates an inter-pulse interval 128 defined between two consecutive pulses of pulse group 152 (e.g., P1 and P2). Notably, any suitable markers may be used to define inter-pulse interval 128 without exceeding the scope of this disclosure, as non-limiting examples, starting times, peaks, an end of a tail edge, a beginning of a leading edge, pre-specified zero-crossings of oscillating signals, and combinations thereof.

In various examples, a respective inter-pulse interval 128 of a first transmitter (e.g., TX1) may be different than a respective inter-pulse interval 128 of another transmitter (e.g., TX3). In particular, the duration of an inter-pulse interval 128 may be indicative of the transmitter from which the pulse group emanated. For example, a respective inter-pulse interval 128 of TX1 may be unique (or unique within a geographical region) to TX1. And, a respective inter-pulse interval 128 of TX3 may be unique (or unique within a geographical region) to TX3. Thus, an inter-pulse interval of a pulse group may be indicative of the transmitter from which the pulse group emanated. Thus, in various examples, a transmitter may be configured to transmit pulses (e.g., within a pulse group) at a regularity, or separated by an inter-pulse interval that is indicative of the transmitter. In various examples, a pre-specified inter-pulse interval may be known to a transmitter and a receiver, and an offset from the pre-specified inter-pulse interval may be used to encode and decode a transmitter identifier.

FIG. 1B illustrates a pulse-group duration 126, which has a duration of time defined between the start of the first pulse of a pulse group (e.g., start of pulse group 130) and the start of the first pulse of a next pulse group (not illustrated in FIG. 1B) (e.g., end of pulse group 132).

Figure 1C:
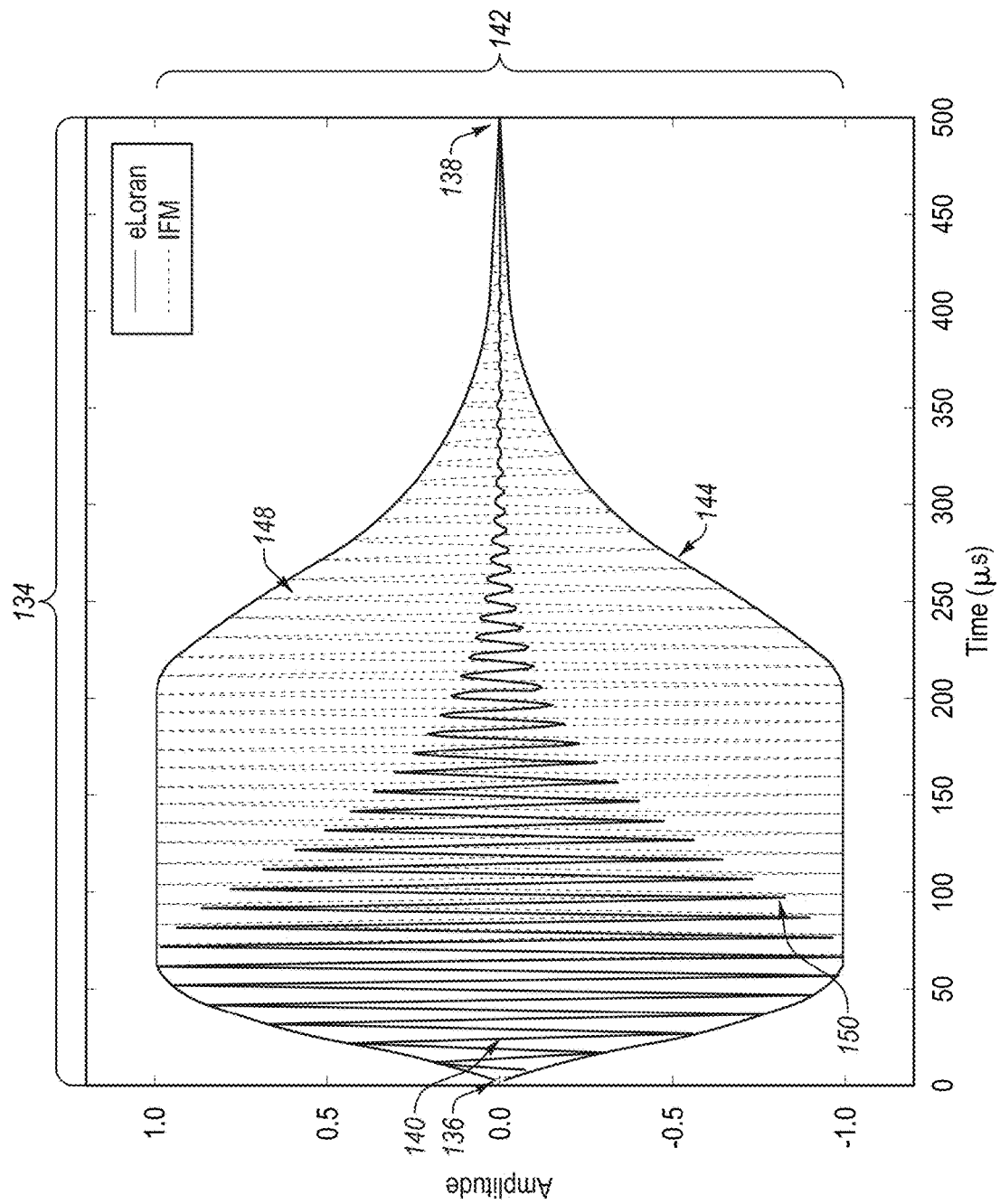
FIG. 1C illustrates two example pulses according to one or more examples.

FIG. 1C illustrates a ranging pulse 148 of a ranging signal according to one or more examples and a standard eLoran pulse 150 known to the inventors of this disclosure superimposed on ranging pulse 148. In particular, FIG. 1C illustrates a shorter pulse as a solid line that illustrates standard eLoran pulse 150 and a longer pulse as a dashed line that illustrates ranging pulse 148 at least a portion of which has undergone intra-pulse frequency modulation (IFM). Notably a pulse envelope 144 of ranging pulse 148 includes a stable peak for a duration of time while a pulse envelope of standard eLoran pulse 150 includes a peak for a shorter duration of time. The stable peak of pulse envelope 144 provides additional time for IFM encoding of information into ranging pulse 148, as discussed herein.

The ranging pulse 148 may be encoded with timing information, e.g., a point in the pulse may be indicative of a timing event. As a non-limiting example, the fourth zero crossing (e.g., zero crossing 140) may be used by a receiver as an indication of a timing event e.g., for positioning, navigation, or timing for a positioning technique (including, as non-limiting examples, multilateration or hyperbolic position estimation calculations). Additionally, the ranging pulse 148 may be encoded with data. As a non-limiting example, the ranging pulse 148 may be frequency modulated to encode data. As a non-limiting example, following zero crossing 140, the ranging pulse 148 may be frequency modulated in two different time sections, e.g., the ranging pulse 148 may be frequency modulated to a first frequency from about 50 microseconds to about 128 microseconds and to a second frequency from about 140 microsecond to about 218 microseconds. Additional description regarding encoding data in frequency of pulses is given with regard to FIG. 1D.

FIG. 1C further illustrates pulse start point 136, which may be a point in time at which the ranging pulse 148 starts, e.g., moves from a point of rest either positive or negative. FIG. 1C also illustrates pulse end point 138 which may be the point in time at which the ranging pulse 148 ends, e.g., returns to a stable point of rest. Together, pulse start point 136 and pulse end point 138 define a pulse duration 134 of ranging pulse 148. Because transmissions after a certain point in the ranging pulse 148 may include ringing, pulse end point 138 may be a defined duration of time after pulse start point 136.

FIG. 1C further illustrates pulse amplitude 142 which may be the amplitude of the ranging pulse 148 from a negative peak value to a positive peak value. Additionally, FIG. 1C illustrates pulse envelope 144 which may be an amplitude envelope in which the oscillations of the ranging pulse 148 fit.

Figure 1D:
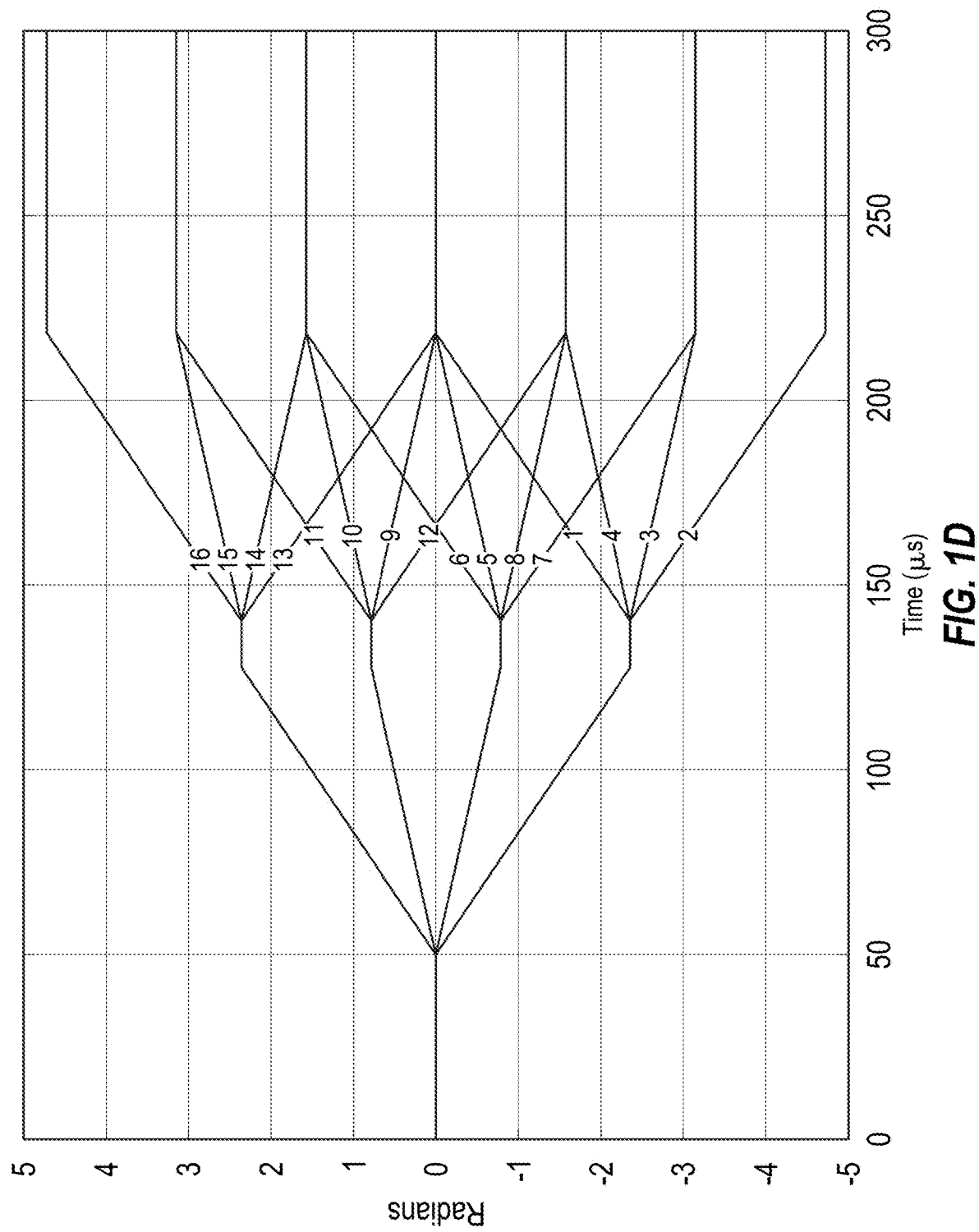
FIG. 1D illustrates phases over time of sixteen example symbols according to one or more examples.

FIG. 1D illustrates phases over time of sixteen examples symbols of a ranging signal according to one or more examples. In particular, FIG. 1D illustrates that the phase of a carrier (e.g., a 100 kHz carrier) may be frequency modulated to arrive at one of the 16 possible phase trajectories. A single pulse (e.g., a ranging pulse), may have phases according to FIG. 1D during the durations illustrated in FIG. 1D. Thus a single ranging pulse may encode one of the 16 symbols. The 16 symbols may provide for 4 bits of data per ranging pulse.

Table 1 provides additional detail regarding the phases during the duration illustrated in FIG. 1D and symbols encoded thereby.

TABLE 1

| Intra-pulse frequency phase modulation | | |
|---|---|---|
| Time Range | Symbols | Linear Phase Change Over Time |
| 0 to 50 µs | All | 0 |
| 50 µs to 128 µs | 1, 2, 3, 4 | $-3\pi/4$ |
| | 5, 6, 7, 8 | $-\pi/4$ |
| | 9, 10, 11, 12 | $\pi/4$ |
| | 13, 14, 15, 16 | $3\pi/4$ |
| 128 µs to 140 µs | All | 0 |
| 140 µs to 218 µs | 2, 7, 12, 13 | $-3\pi/4$ |
| | 3, 8, 9, 14 | $-\pi/4$ |
| | 4, 5, 10, 15 | $\pi/4$ |
| | 1, 6, 11, 16 | $3\pi/4$ |
| >218 µs | All | 0 |

FIG. 2 illustrates a pulse-ordering scheme 200 according to one or more examples. In particular, FIG. 2 includes one example arrangement of types of pulses 206 of ranging pulses assigned to respective pulse positions 204 in pulse groups of an epoch to illustrate how different types of ranging pulses (i.e., ranging pulses encoded with different types of data, such as template pulses, time message pulses, and data message pulses, without limitation) may be arranged in pulse groups in an epoch. Varying the arrangement of types of ranging pulses within an epoch may decrease the impact of burst errors on data transmission, and more specifically, improve performance of forward error correction techniques. Pulse-ordering schemes may be chosen according to any suitable algorithm, as a non-limiting example, an algorithm that improves performance of Reed-Solomon type of FEC blocks.

FIG. 2 illustrates three different types of data that may be encoded in ranging pulses (e.g., by applying IFM or another frequency modulation technique to a portion of a ranging pulse, without limitation) of a ranging signal, in accordance with one or more examples. As a non-limiting example, FIG. 2 illustrates template pulses ("0"), time-messages pulses ("1"), and data-message pulses ("2"). Use of fewer types of pulses or other types of pulses, additionally or alternatively to those discussed herein, does not exceed the scope of this disclosure.

Template pulses are used, generally, to associate ranging pulses with specific symbols. A set of template pulses may include one ranging pulse for each symbol encoded by the different ranging pulses (e.g., 16 in the example illustrated in FIG. 2 (which corresponds to the 16 symbols illustrated in FIG. 1D and Table 1)). In a contemplated operation, a transmitter of an epoch may transmit the set of template pulses each epoch. A receiver may receive the template pulses during the epoch, and use the template pulses as templates, e.g., the receiver may compare other received ranging pulses in the same or subsequent epochs to the template pulses to determine which symbols were encoded by the other ranging pulses. As a non-limiting example, if a ranging pulse can encode one of sixteen different symbols (e.g., by frequency modulating two different portions of the pulse independently (e.g., as illustrated and described with regard to FIGS. 1C and 1D)), an epoch may include sixteen template pulses, one for each symbol. A receiver may compare the received template pulses to received ranging pulses to identify respective symbols encoded in the received pulses.

Time-message pulses may collectively encode timing information (e.g., by frequency modulating one or more portions of each of the pulses). As a non-limiting example, a transmitter may be configured to keep a count of epochs, e.g., as an "epoch number" and may transmit the epoch number encoded in the timing-message pulses of each epoch. The time-message pulses may include one or more error-correction bits, e.g., according to a Reed-Solomon error-correction scheme. As an example of encoding timing information, the epoch number may be a 32-bit number and the 28 time-message pulses of an epoch may collectively encode the epoch number and the one or more error-correction bits. For example, each time-message pulse may encode 4 bits of the epoch number (e.g., each pulse may encode one of the 16 symbols described with regard to FIG. 1D and Table 1). Further, some of the bits encoded in the time-message pulses may be error-correction bits.

Data-message pulses may collectively encode a data message (e.g., by intra-pulse frequency modulating one or more portions of each of the pulses, without limitation). Data-message pulses may communicate a message, e.g., from a system operator of a LORAN system to user of a LORAN receiver. Non-limiting examples of information transmitted via data-message pulses include differential corrections, almanac information on transmitters and differential monitors, or messages, including, as non-limiting examples, emergency alerts or weather alerts. The data-message pulses may further include one or more error-correction-message pulses, e.g., an FEC block according to a Reed-Solomon error-correction scheme. For example, each data-message pulse may encode 4 bits of the data message (e.g., each pulse may encode one of the 16 symbols described with regard to FIG. 1D and Table 1). Further, some of the bits encoded in the data-message pulses may be error-correction bits.

As a non-limiting example, FIG. 2 illustrates ten pulse groups 202 ("Group Repetition Intervals" GRI1-GRI10), each including 12 pulse positions 204. Thus, FIG. 2 illustrates one hundred twenty pulse positions of an epoch. A "pulse position" is a relative position of a ranging pulse within an ordered set of ranging pulses of a pulse group.

During each epoch, a transmitter may be configured to transmit all of the pulses of the epoch according to a pulse-ordering scheme such as pulse-ordering scheme 200. By arranging the different types of pulses 206 according to pulse ordering scheme 200, a receiver may be able to determine which pulses are of which type. Thus, for example, a receiver may be able to determine which pulses are template pulses, time-message pulses, and data-message pulses based on the pulse position. Further, the template pulses may be ordered so that a receiver may identify the symbol based on the order of the template pulse. Similarly, the time-message pulses or data-message pulses may be ordered such that the receiver may identify a type of a pulse based on the pulse position.

Moreover, by arranging the different types of pulses 206 according to pulse-ordering scheme 200, a transmitter may decrease the impact of errors that may result from repetitive or burst interference (e.g., from another transmitter). As a non-limiting example, if a series of two or more adjacent (in time) pulses is received with a high degree of interference, e.g., as a result of a nearby transmitter or lightning, the impact on the total information encoded in the pulse groups of the epoch may be decreased because different types of pulses 206 may be impacted as a result of the variability introduced by the pulse-ordering scheme. By decreasing an impact of burst errors on any particular type of pulse, error correction (e.g., Reed-Solomon error correction) may be enabled to function more effectively. Accordingly, one aspect of a pulse-ordering scheme is that groups of pulses of the same types may be separated by pulses of different types, e.g., to decrease a number of pulses of the same type that are broadcast in series.

In various examples, the epoch number in time-message pulses or data in the data-message pulses may be encrypted. For example, the epoch number, encoded into the time-message pulses, may be encrypted prior to encoding. As another example, the data message, encoded into the data-message pulses, may be encrypted prior to encoding. A single encrypted data message may span one or more epochs. Encryption of the epoch number or data message may be such that the epoch number or data message may be indecipherable without an encryption key. Thus, a recipient of all of the pulses of an epoch, and in possession of the pulse-ordering scheme 200, but not in possession of the encryption key, may be able to recover the symbols encoded by the time-message pulses or the data-message pulses, but, may not be able to decrypt the epoch number or the data.

Alternatively, in various examples, the timing information may not be encrypted, e.g., the timing information may be transmitted in the clear. Not encrypting the timing information may enable a receiver of the time-message pulses to obtain timing information, e.g., an epoch number, without possessing an encryption key. Allowing a receiver to obtain the epoch number without an encryption key may allow the receiver to obtain information (e.g., more accurate timing information by correcting dither which will be described in more detail below).

However, transmitting the timing information in the clear may leave the timing information vulnerable to spoofing. In various examples, the timing information may be transmitted in the clear (e.g., in time-message pulses) and second timing information may be transmitted, encrypted, in data-message pulses. The second timing information may be encrypted and thus, less vulnerable to spoofing than the timing information transmitted in the clear.

Further, the second timing information may include additional timing information not included in the timing information, e.g., a leap second count. Including the additional timing information in the second timing information may allow receivers in possession of the encryption key to obtain more detailed or more accurate timing information than is obtainable by receivers not in possession of the encryption key. Further, including the additional timing information in the second timing information may allow the timing information of the time-message pulses to not include the additional timing information, which may allow the number of time-message pulses to be reduced or the time-message pulses to include additional error-correction bits.

Additionally, or alternatively, one or more examples relate, generally, to controlling usability of ranging pulses to limit accurate use of the ranging pulses to certain recipients by adding a time offset (called a "dither offset" or just "dither") that a specific recipient with a dither correction can correct for prior to using the ranging pulses. As a non-limiting example, controlling usability may facilitate privatization of the ranging pulse and a navigation system using the same.

Figure 3:
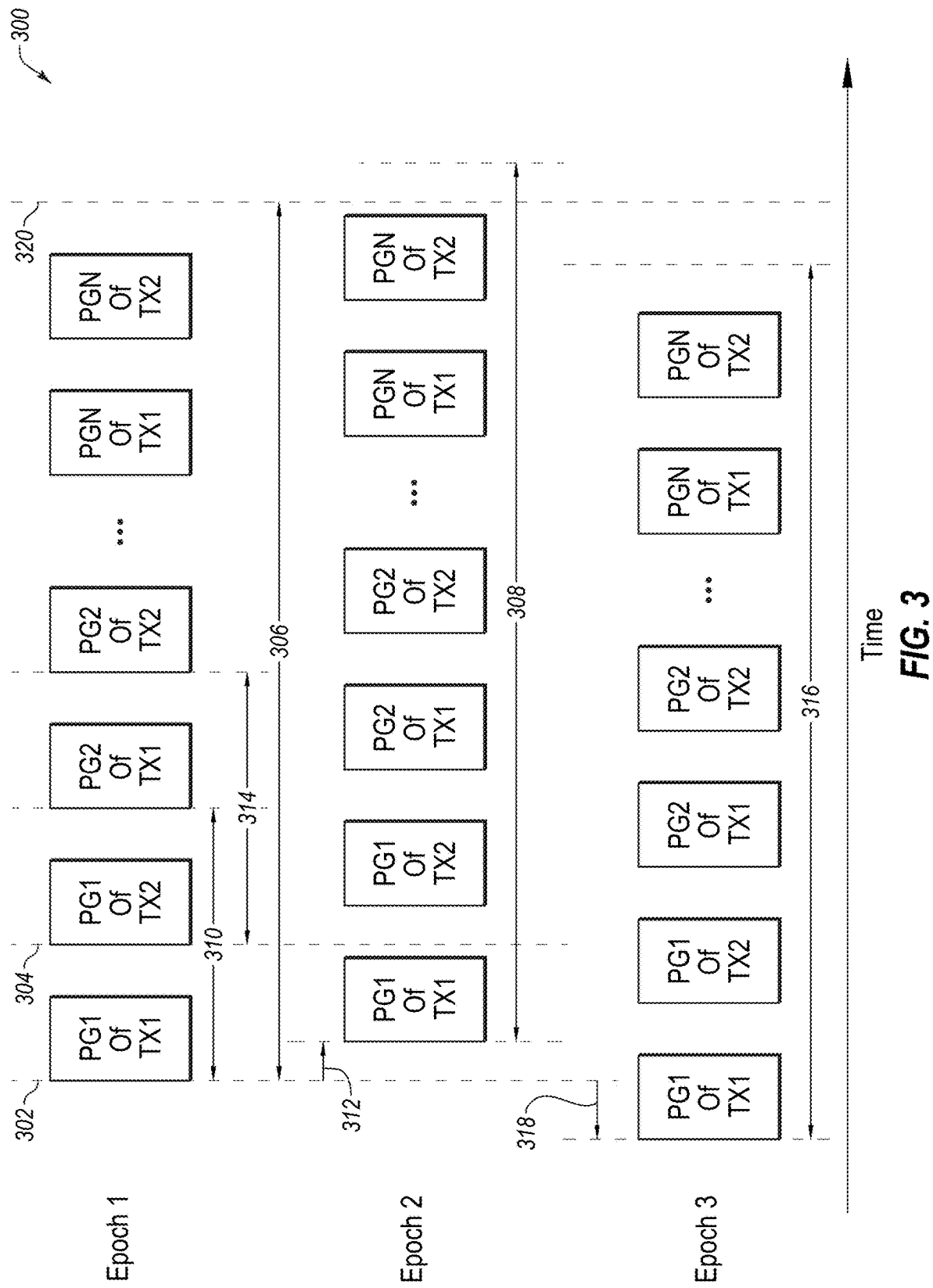
FIG. 3 illustrates example timings of pulse groups within epochs exhibiting chain-level dithering according to one or more examples.

FIG. 3 is a timing diagram 300 that illustrates example timings of pulse groups having dithering, according to one or more examples. In particular, FIG. 3 illustrates timings of pulse groups of three epochs (epoch 1, epoch 2, and epoch 3). The pulse groups that occur during epoch 1 are not dithered. (In the present disclosure, pulse groups that occur during an epoch may be referred to as pulse groups "of" the epoch). The pulse groups of epoch 2 are delayed and the pulse groups of epoch 3 are advanced with respect to time 302.

FIG. 3 illustrates nominal epoch start time 302 as the nominal start time of each of epoch 1, epoch 2, and epoch 3. In various examples, Epochs 1, 2, and 3 may be sequential or non-sequential. FIG. 3 also illustrates nominal second-epoch start time 320. Nominal second-epoch start time may follow nominal epoch start time 302 by an epoch duration (i.e., the duration of an epoch).

The pulse groups of epoch 1 are illustrated without dithering. In particular, the first pulse group of the first transmitter ("PG1 of TX1") is illustrated as beginning at nominal epoch start time 302, i.e., PG1 of TX1 was not dithered (delayed or advanced) from nominal epoch start time 302. The second pulse group of the first transmitter ("PG2 of TX1") starts at group-repetition interval 310 after nominal epoch start time 302. Also, the first pulse group of the second transmitter ("PG1 of TX2") starts at nominal second-pulse-group start time 304, i.e., PG1 of TX2 was not dithered from nominal second-pulse-group start time 304. Also, PG2 of TX2 starts at group-repetition interval 314 after nominal second-pulse-group start time 304. Epoch duration 306 is the duration of epoch 1.

The pulse groups of epoch 2 are delayed by delay offset 312. In particular, PG1 of TX1 of epoch 2 is delayed from nominal epoch start time 302 by delay offset 312. Similarly, PG1 of TX2 of epoch 2 is delayed from nominal second-pulse-group start time 304 by delay offset 312. Likewise, all pulse groups of epoch 2 are delayed by delay offset 312. The timing of pulse groups (e.g., dithered or un-dithered) applies equally to all ranging pulses of the pulse groups. For example, all of the ranging pulses of PG1 of TX1 of epoch 2 are delayed by delay offset 312. Despite the delay of epoch 2, a subsequent epoch would begin at nominal second-epoch start time 320 and not after nominal epoch duration 308. To facilitate this, in various examples, the delay offset 312 may be selected to be shorter than a nominal duration between the end of a last ranging pulse of a last pulse group of an epoch and the beginning of a first ranging pulse of a first pulse group of a subsequent epoch.

The pulse groups of epoch 3 are advanced by advance offset 318. In particular, PG1 of TX1 of epoch 3 is advanced from nominal epoch start time 302 by advance offset 318. Similarly, PG1 of TX2 of epoch 3 is advanced from nominal second-pulse-group start time 304 by advance offset 318. Likewise, all pulse groups of epoch 3 are advanced by advance offset 318. Despite this advance, a subsequent epoch nominally would begin at nominal second-epoch start time 320 and not after epoch duration 316. To facilitate this, in various examples, the advance offset 318 may be selected to be shorter than a nominal duration between the end of a last ranging pulse of a last pulse group of an epoch and the beginning of a first ranging pulse of a first pulse group of a subsequent epoch.

The term "chain-dithering interval" may refer to a time interval by which all ranging pulses of all pulse groups of all transmitters of a group of transmitters (which may be referred to as a chain) are delayed or advanced (relative to a nominal timing). A chain-dithering interval (e.g., delay offset 312 or advance offset 318) may apply for the duration of an epoch. In subsequent epochs, the pulse groups of all transmitters of a group of transmitters may be delayed or advanced by a different chain-dithering interval, or by none at all.

Figure 4:
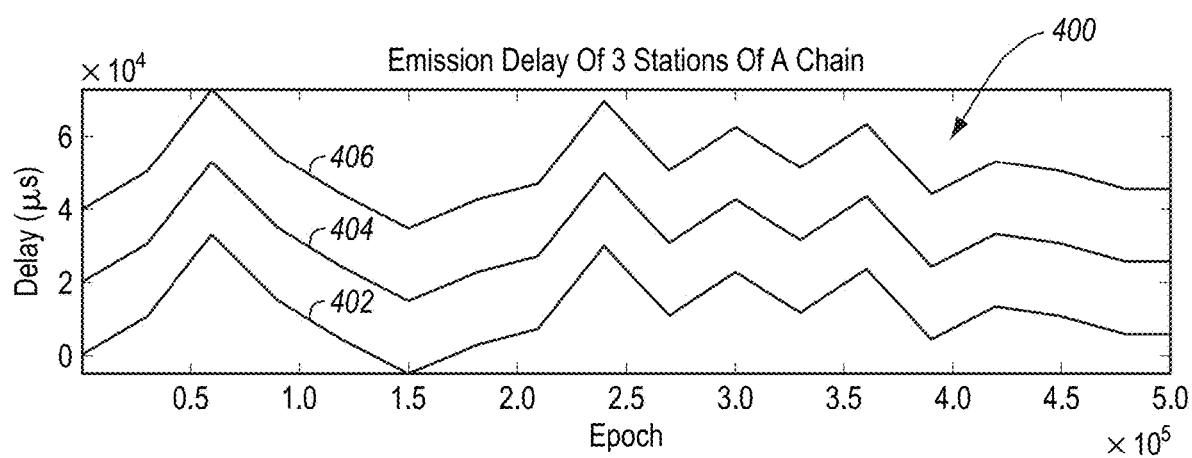
FIG. 4 illustrates an example of chain-level dithering over time according to one or more examples.

As an example of chain-level dithering, FIG. 4 illustrates chain-level dither offsets 400 of Emission Delay of 3. Stations of a Chain over time. In particular, FIG. 4 illustrates a first emission delay 402 of a first transmitter of a chain, a second emission delay 404 of a second transmitter of the chain, and a third emission delay 406 of a third transmitter of the chain. Third emission delay 406 is delayed relative to second emission delay 404 by a nominal emission delay (e.g., 20,000 microseconds). Similarly, second emission delay 404 is delayed relative to first emission delay 402 by the nominal emission delay. FIG. 4 illustrates that each of first emission delay 402, second emission delay 404, and third emission delay 406 are substantially parallel. First emission delay 402, second emission delay 404, and third emission delay 406 are substantially parallel because all of first emission delay 402, second emission delay 404, and third emission delay 406 are delayed by the same chain-level dithering each epoch.

In various examples, a change in dithering of a chain (i.e., a change in dithering of all of the pulses of all of the pulse groups transmitted by a chain of transmitters) over time may follow a trend. For example, FIG. 4 illustrates changes in dithering of the chain following a ramp pattern between several points (e.g., pseudo-randomly selected points). For example, the chain-level dither offsets 400 may have several random values and may follow a ramp between the several random values. Thus, in the example illustrated in FIG. 4, between any two epochs, the change in dithering may be small relative to a change over many (e.g., 50,000 epochs). For example, at epoch 1, the chain dithering may be 0 microseconds, at epoch 2, the chain dithering may be slightly longer (e.g., 0.4 microseconds longer), and at epoch 50,000, the chain dithering may be 20,000 microseconds. Thus, the magnitude of the chain-level dithering may be on the order of tens of thousands of microseconds when considered over many epochs while the magnitude of change between any two epochs may be much smaller, (e.g., 1 microsecond or less).

Figure 5:
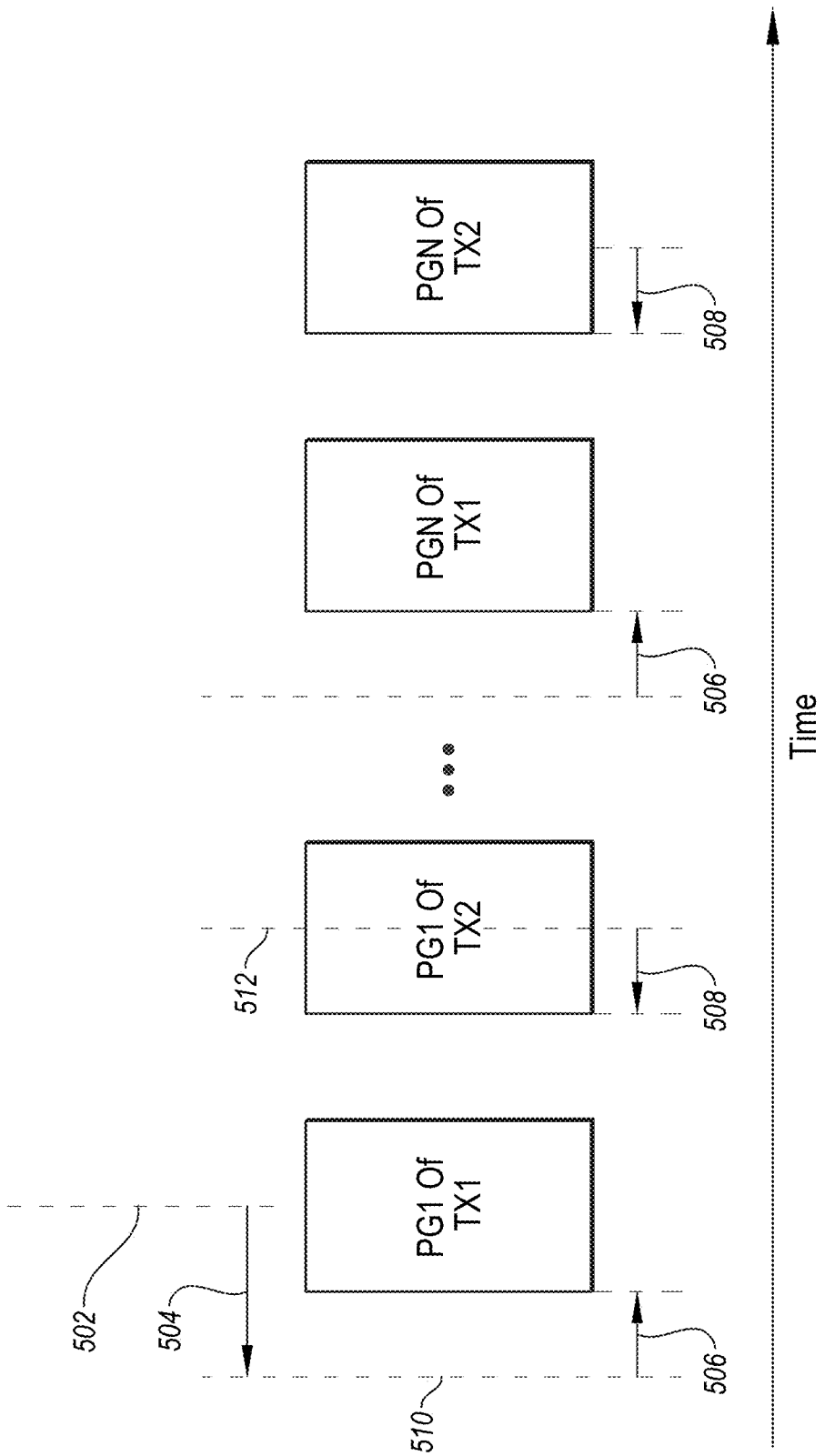
FIG. 5 illustrates example timings of pulse groups within an epoch exhibiting station-level dithering according to one or more examples.

In addition to chain-level dithering (e.g., as illustrated and described with regard to FIG. 3), individual stations may dither timing of pulse groups. For example, FIG. 5 illustrates station-level dithering. The station-level dithering may be analogous to the chain-level dithering in that station-level dithering may involve dithering all ranging pulses of all pulse groups for an epoch. However, in contrast to chain-level dithering, station-level dithering may be applied by stations individually and not by a chain of stations together.

FIG. 5 illustrates an epoch 4 that includes both chain-level dithering and station-level dithering. FIG. 5 illustrates a nominal epoch start time 502. FIG. 5 illustrates a chain-dithering interval 504 by which all of the pulse groups (including, e.g., PG1 of TX1, PG1 of TX2, PGN of TX1 and PGN of TX2) of a chain (e.g., TX1 and TX2) are advanced for the duration of epoch 4. That is, based on the chain-dithering interval, the first pulse of epoch 4 (PG1 of TX1) would begin at chain-dithered start time 510.

However, FIG. 5 illustrates that PG1 of TX1 is delayed by station-level delay offset 506. For example, during epoch 4, TX1 delays all of its pulse groups by station-level delay offset 506.

Also, FIG. 5 illustrates that the pulse groups of TX2 are advanced (e.g., relative to chain-dithered second-pulse-group start time 512) by station-level advance offset 508. Station-level delay offset 506 is independent of station-level advance offset 508.

The term "station-dithering interval" may be a time interval by which all pulse groups of a transmitter are delayed or advanced (relative to a nominal timing or relative to a nominal timing and a chain-level dither). A station-dithering interval may apply for the duration of an epoch. In subsequent epochs, the pulse groups of the transmitter may be delayed or advanced by a different station-dithering interval. In some cases, all pulse groups of each transmitter of each epoch may be delayed by a different chain-dithering interval, or by no chain-dithering interval. As an example of using a different station-dithering interval each epoch, FIG. 6 illustrates station-level dither offsets 602 of Emission Delay of a $1^{st}$ Station for example Epochs 1-900.

In various examples, a change in dithering of a station (i.e., a change in dithering of all of the ranging pulses of all of the pulse groups transmitted by a transmitters) over time may follow a trend. For example, the station-level dither offsets 602 may have several random values and may follow a ramp between the several random values. For example, FIG. 6 illustrates changes in dithering of the station following a ramp pattern between several points. Thus, in the example illustrated in FIG. 6, between any two epochs, the change in dithering may be small relative to a change over many (e.g., 50 respective epochs). For example, at the 300th epoch, the station dithering may be a delay of 60 microseconds, at the 301st epoch, the station dithering may be slightly longer delay (e.g., 1 microsecond longer), and at the 350th epoch, the chain dithering may be a delay of 110 microseconds. Thus, the magnitude of the station-level dithering may be on the order of tens or hundreds of microseconds when considering many epochs while the magnitude of change between any two epochs may be much smaller, (e.g., 1 microsecond or less).

Figure 6:
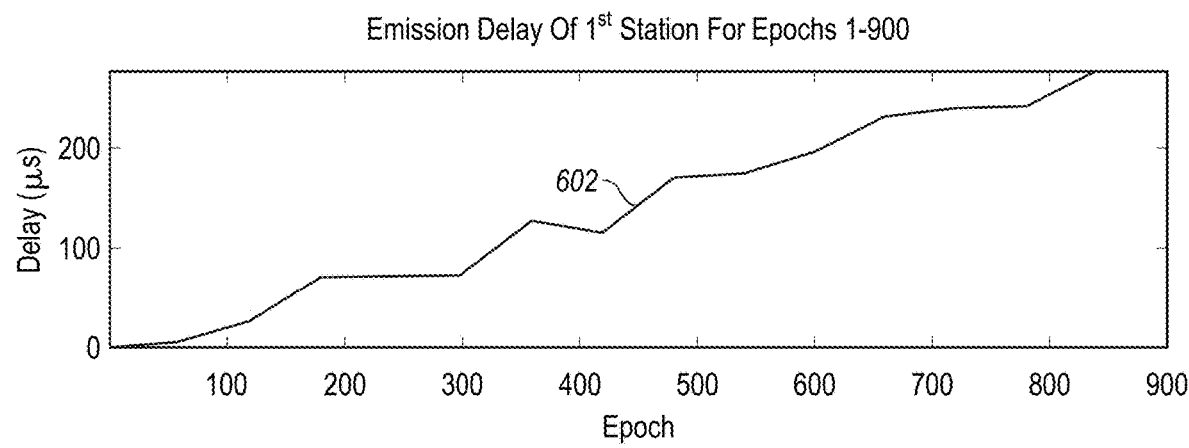
FIG. 6 illustrates an example of station-level dithering over time according to one or more examples.

The example of station-level dithering that includes chain level dithering is illustrated in FIG. 6 may be implemented in addition to chain-level dithering as described above in relation to FIG. 5. Thus, in addition to station-level dither offsets 602, chain-level dithering may add, or subject, dithering to the station-level dither offsets 602. For example, an upward trend from the 0th epoch to the 900th epoch that may result, at least in part, from chain-level dithering, e.g., the chain-level dithering illustrated in FIG. 4.

Additionally, in various examples, a magnitude of change caused by a chain-dithering interval over time may be larger or smaller (e.g., by an order of magnitude or more) than a magnitude of change caused by a station-dithering interval over the same time. For example, a magnitude of change caused by the chain-level dither offsets 400 of FIG. 4 may be one hundred times greater in magnitude than the magnitude of change caused by station-level dither offsets 602 of FIG. 6. Stated another way, in terms of overall dithering over time, chain-level dithering may impact an instantaneous dither, i.e., the dither between 2 subsequent epochs, 100 times more than the station-level dithering impacts the instantaneous dither.

Additionally, in various examples, the duration of a ramp of chain-level dithering may be different (e.g., by an order of magnitude or more) than a duration of a ramp of station-dithering interval. For example, the chain-level dither offsets 400 of FIG. 4 may follow a ramp between two values for a duration of 30,000 epochs while the station-level dither offsets 602 of FIG. 6 may follow a ramp between two values for a duration of 60 respective epochs.

The magnitude of the chain-dithering interval or the station-dithering interval may be selected to be smaller than a default duration between pulse groups (or epochs). For example, the chain-dithering interval and the station-dithering interval may be selected such that even if a chain and station were delayed during a 1st epoch, and the chain and station were advanced during the next epoch, an overlap of pulse groups would be avoided. As another example, the station-dithering interval may be selected such that if ranging pulses of a first transmitter were delayed, and ranging pulses of a second transmitter were advanced, signals from the first and second transmitter would not overlap.

By dithering one or more pulse groups during one or more epochs (e.g., as illustrated by FIG. 3 and FIG. 5) it may be possible to privatize the signals of a system (e.g., a timing-dependent system). As a non-limiting example, receivers may depend on timing (e.g., the time of arrival of signals at the receiver) to calculate positioning, navigation, or timing information. If signals transmitted at one or more transmitters are dithered, the receiver may be unable to accurately calculate positioning, navigation, or timing information. In other words, the dithering may introduce errors in positioning, navigation, or timing information calculable at a receiver.

In various examples, one or more of the transmitters may dither signals according to a dithering schedule. The dithering schedule may include a pre-defined dithering schedule which is a schedule of dithering intervals (e.g., chain-dithering intervals or station-dithering intervals) to apply to signals transmitted during a number of epochs. A receiver, in possession of the dithering schedule, may be able to correct for the effects of the dithering on the received signals and thereby accurately calculate positioning, navigation, or timing information. Receivers without the dithering schedule may be unable to accurately calculate positioning, navigation, or timing information from the dithered signals.

Transmitters or chains may privatize their signals, e.g., by making accurate use of the signals dependent on possession of the dithering schedule. An operator of the transmitters may sell the dithering schedule, e.g., on a subscription basis.

In one or more examples, multiple levels of service may be defined to allow for various levels of accuracy calculable at a receiver. As a non-limiting example, transmitters may include two or more instances of dithering and sell the dithering schedules separately. Additionally or alternatively, dithering schedules including different degrees of accuracy may be sold. Specific users receive two keys, and lower level users a single key. The dither could be the sum of two terms, specific users would have access to both terms (via their keys), and lower level users could only access a coarse term (via their key).

The dithering schedule may be encrypted or be usable only with a key such that a receiver must possess a key to utilize the dithering schedule. The dithering at a chain or station may be related to the epoch number. As a non-limiting example, the dithering schedule may include dithering intervals for each epoch number. Thus, the dithering schedule may be indexable by epoch number. As an example, the dithering schedule may include a function (e.g., an encryption algorithm) that may accept as input the key and the epoch number and may return corrections for dithering for one or more stations for that epoch. A receiver may use the corrections to correct ranging pulses received during the epoch. Thus, possession of both the epoch number and the key may be critical for the accurate calculation of PNT information.

In various examples, the magnitude of the chain-level dithering or the station-level dithering may be selected according to a ramp such that a receiver may be able to decode an epoch number from transmissions without fully correcting the dithering. For example, a magnitude of the chain-level dithering or the station-level dithering may be selected to be great enough to render location calculations inaccurate, yet, at the same time, because of the ramp, and the relatively small difference between dithering of individual pulse groups, a receiver may be able to decode an epoch number from the broadcast cycle. Thus, during initialization of a receiver, the receiver may be able to obtain an epoch number that can then be used with the dithering schedule to correct the ranging pulses. Additionally or alternatively, the ramps in the magnitudes of chain-level dithering or the station-level dithering may prevent or render it difficult to resolve the dithering by averaging over epochs.

In addition to chain-level dithering or station-level dithering, in various examples, masked dithering may be applied. The masked dithering may be used to mask trends in dithering. As a non-limiting example, signals may be dithered according to one or more ramps (e.g., as illustrated in FIGS. 4 and 6). The masked dithering may obscure the one or more ramps or make predicting dithering more difficult or improbable. In particular, the masked dithering may include pseudo-random dithering applied to pulse groups (including to all ranging pulses of the pulse group). The masked dithering may employ different amounts of dithering each epoch independent of the dithering of prior epochs. For example, the masked dithering may not follow a ramp. Thus, the masked dithering may be relatively highly different between one epoch and the next compared with the change resulting from masked dithering over many epochs. The relatively high degree of difference between subsequent epochs of masked dithering may mask the relatively low degree of difference between dithering of chain-level dithering or station-level dithering. For example, in the absence of the mask layer of dithering, a receiver, e.g., a receiver that is not in possession of the dithering schedule, may be able, over time to observe the ramp of the chain-level dithering and the station-level dithering and predict the dithering of future pulse groups. However, with the masked dithering applied, a receiver is less able to observe the ramp of either the chain-level dithering or the station-level dithering.

Figure 7:
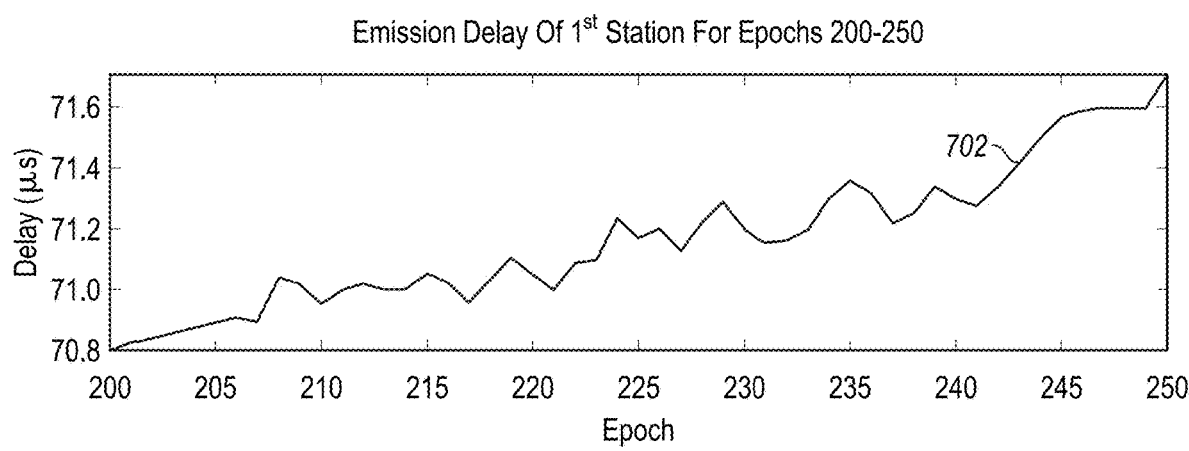
FIG. 7 illustrates an example of masked dithering over time according to one or more examples.

FIG. 7 illustrates an example of dither of epochs including a masked dithering in Emission Delay of a 1st Station for example Epochs 200-250. As can be seen in FIG. 7, unlike the dithering illustrated in FIGS. 4 and 6, the masked dithering may not include values in between which the dithering follows a ramp, e.g., the masked dithering is pseudo-random each epoch. As with station-level dither offset 602 of FIG. 6, the masked-dither offset 702 of FIG. 7 may exhibit chain-level dithering and station-level dithering and the masked dithering is an addition thereto. Thus, from 200th epoch to 250th epoch of FIG. 7, masked-dither offset 702 may exhibit a general upward trend (e.g., from a 70.8 microseconds dither to a 71.7 microseconds dither after 50 respective epochs). However, the masked dither is a pseudo-random dither (with a mean value of zero) applied in addition to the chain-level and station-level dithering each epoch. Thus, the masked dither does not cause any trend in the dither over time.

In various examples, masked dithering may change the timing of pulse groups by magnitudes (of timing) that are smaller or larger than (e.g., by an order of magnitude or more) the chain-dithering interval or the station-dithering interval. For example, as illustrated in FIG. 7, for respective epochs, masked dithering may dither a signal on the order of 0.2 microseconds. However, because the masked dither has a mean value of zero, the masked level of dither does not cause a trend over time. In other words, the masked dither may account for a 0.2 microsecond swing between the 1st epoch and the 2nd epoch and the masked dither may account for a 0.2 microsecond swing between 1st epoch and the 300th epoch or 50,000th epoch. In other words, the magnitude of the masked dithering may be the same whether considering many epochs or single epochs.

As with the chain-level dithering and the station-level dithering, the masked dithering may be included in the dithering schedule such that the masked dithering may be corrected for (e.g., by a receiver in possession of the dithering schedule) before calculating positioning, navigation, or timing information from the dithered signals.

Additionally or alternatively, one or more examples relate, generally, to providing for validation of pulse groups by encoding a signature in phases of ranging pulses of pulse groups.

Figure 8A:
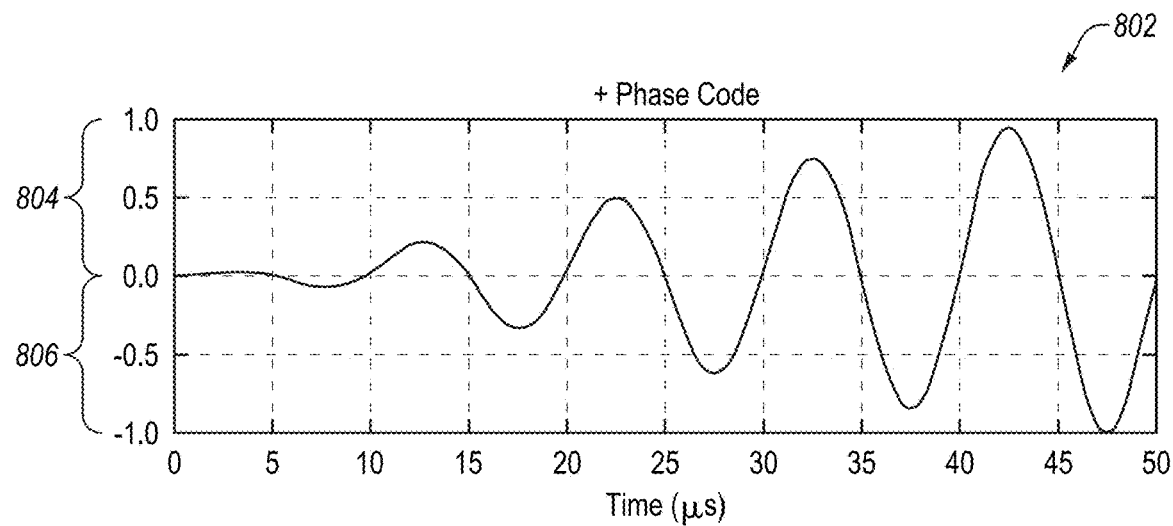
FIG. 8A illustrates a graph that represents a positive-phase-code pulse for an example pulse.
Figure 8B:
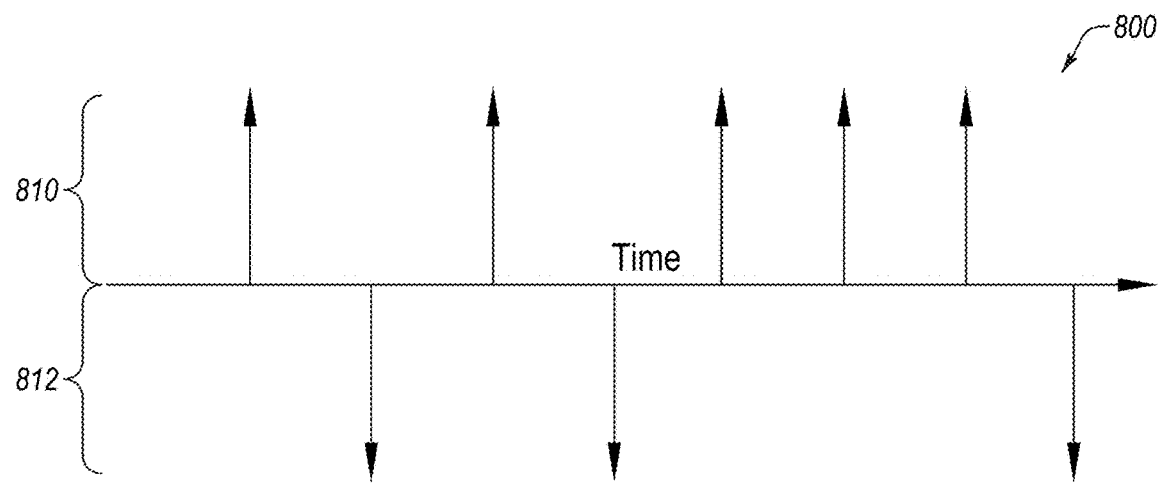
FIG. 8B illustrates a graph that represents the example pulse group that includes positive-phase-code pulses (e.g., of FIG. 8A) and negative-phase-code pulses (e.g., of FIG. 8C).
Figure 8C:
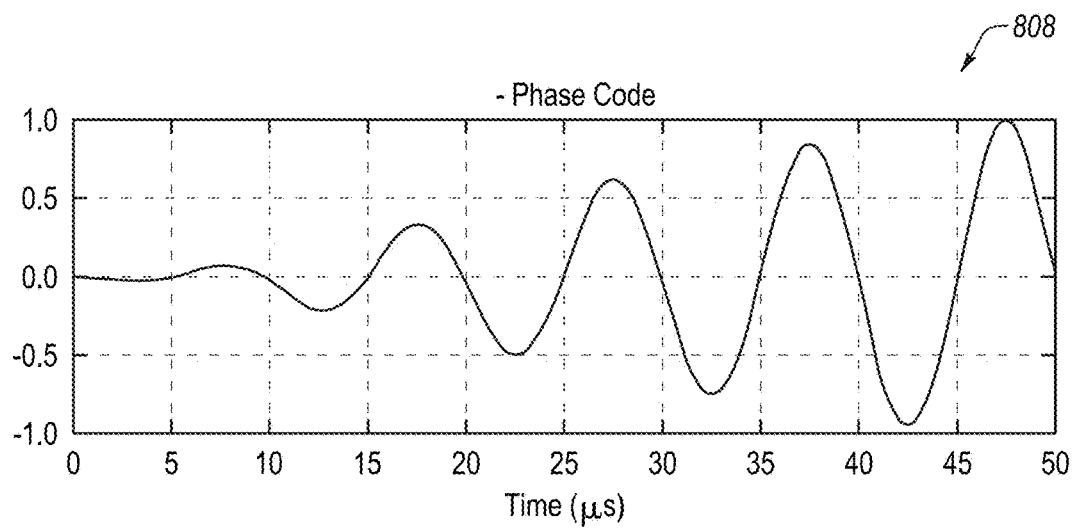
FIG. 8C illustrates a graph that represents a negative-phase-code pulse for the example pulse.

FIGS. 8A, 8B and 8C illustrate graphs that represent phase encoding of a pulse group 800 by applying pre-specified phase signatures, according to one or more examples.

FIG. 8A illustrates a graph that represents a positive-phase-code pulse for an example pulse group 800. FIG. 8C illustrates a graph that represents a negative-phase-code pulse for the example pulse group 800. A ranging pulse, e.g., positive-phase-code pulse 802 may include multiple positive half cycles 804 and multiple negative half cycles 806. A ranging pulse may have a positive phase code, e.g., as illustrated by positive-phase-code pulse 802 or a negative phase code, e.g., as illustrated by negative-phase-code pulse 808 (FIG. 8C). As a non-limiting example, positive-phase-code pulse 802 may begin with one of positive half cycles 804 and negative-phase-code pulse 808 may begin with one of negative half cycles 806. Negative-phase-code pulse 808 may be 180 degrees out of phase with positive-phase-code pulse 802.

The zero-crossings of positive-phase-code pulse 802 and negative-phase-code pulse 808 may be the same, which may be relevant to timing, e.g., for positioning, navigation, or timing. Further, the frequency (or frequencies) of positive-phase-code pulse 802 and negative-phase-code pulse 808 may be the same. As such, positive-phase-code pulse 802 and negative-phase-code pulse 808 may encode, by frequency modulation and timing, the same information and be decoded in the same way.

FIG. 8B illustrates a pulse group 800 that includes positive-phase-code pulses 810 and negative-phase-code pulses 812. Accordingly, the phases of all of the ranging pulses in the pulse group, collectively, may be used to encode information (e.g., a signature of a transmitter). Encoding information in the phases of ranging pulses of a pulse group may not affect timing or other data encoding included in the pulse group.

Phases of ranging pulses of a pulse group may be used to allow for validation of a signal (and consequently data) to increase security of a system. In particular, phases of ranging pulses of a pulse group may be encoded to prevent (or increase the difficulty of) spoofing a signal from a transmitter of the system. In other words, a system may use phase-encoding for anti-spoofing purposes.

As a non-limiting example, a transmitter may phase ranging pulses of pulse groups such that the transmitted pulse groups match a pulse phase signature. The transmitter may change pulse phase signatures each epoch according to a pulse-phase-signature schedule. As a non-limiting example, a transmitter may transmit a first pulse group that matches a first pulse phase signature in a first epoch in accordance with the pulse-phase-signature schedule and transmit a second pulse group that matches a second pulse phase signature in a second epoch according to the pulse-phase-signature schedule.

A receiver, in possession of the pulse-phase-signature schedule may be able to verify that the transmitter transmitted the signal, e.g., by comparing phases of the received pulse groups to the pulse-phase-signature schedule. Further the pulse-phase-signature schedule may be related to the epoch number. As a non-limiting example, the pulse-phase-signature schedule may include pulse phase signatures indexable by the epoch number.

The pulse-phase-signature schedule may be encrypted such that a receiver must possess a key to utilize the pulse-phase-signature schedule. As an example, the pulse-phase-signature schedule may include a function that may accept as input the key and the epoch number and may return an expected pulse-phase-signature for the epoch. A receiver may compare received pulse phases to the expected pulse-phase signature to authenticate the received signal.

Figure 9:
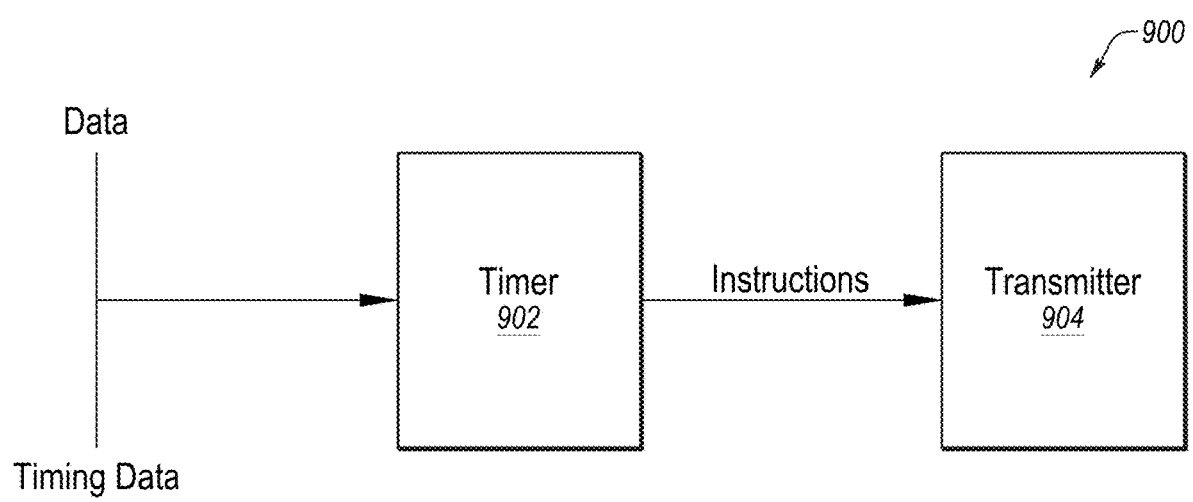
FIG. 9 illustrates an example of system to perform one or more disclosed techniques when generating radio waves (e.g., radio frequency groundwaves) for ranging pulses, according to one or more examples.

FIG. 9 is a functional block diagram that illustrates an example of logical blocks of a system 900 configured to perform one or more disclosed techniques when generating radio frequency groundwaves for ranging pulses, according to one or more examples. In particular, system 900 includes timer 902 and transmitter 904. System 900 may be configured to transmit signals (e.g., ranging pulses in pulse groups of broadcast cycles) according to one or more examples.

Timer 902 may be configured to receive data from, e.g., a control center. The data may include data for transmission, e.g., in data-message pulses (e.g., as described above with regard to FIG. 2).

Additionally or alternatively, timer 902 may be configured to receive timing data, e.g., from a time standard. The timing data may include a time of day, a pulse-per-second signal, or a frequency reference.

Timer 902 may calculate features (e.g., timing, phase, or pulse shape) of signals (e.g., ranging pulses in pulse groups of broadcast cycles) to be transmitted. Timer 902 may calculate the features such that the signals (in aggregate) are according to one or more examples. Timer 902 may provide instructions to transmitter 904 that may be indicative of the signals to be transmitted at transmitter 904.

As a non-limiting example, in various examples, timer 902 may provide transmitter 904 with a template number, e.g., an indication of a ranging pulse (e.g., an intra-frequency modulated (IFM) pulse) to be transmitted. Additionally or alternatively, timer 902 may provide transmitter 904 with an indication of a phase of a ranging pulse to be transmitted. Additionally or alternatively, timer 902 may provide transmitter 904 with an indication of when to transmit a pulse (e.g., a pulse trigger).

Transmitter 904 may transmit signals, e.g., ranging pulses in pulse groups of broadcast cycles. Transmitter 904 may transmit pulses according to the instructions from timer 902. As a non-limiting example, transmitter 904 may transmit a particular ranging pulse based on a template number provided by timer 902. In particular, transmitter 904 may include a look-up table, stored in an accessible memory, including pulses templates. Transmitter 904 may select a ranging pulse for transmission from the look-up table based on the template number received from timer 902. Additionally or alternatively, transmitter 904 may transmit a ranging pulse with a phase according to the indication of phase provided by timer 902. Additionally or alternatively, transmitter 904 may transmit pulses at times indicated by timer 902, e.g., based on receiving a pulse trigger from timer 902.

As a non-limiting example, timer 902 may determine an inter-pulse interval such that system 900 has a unique (or unique within a geographical area) inter-pulse interval for identifying transmitter 904, e.g., as described above with regard to FIG. 1B. Timer 902 may provide instructions (e.g., pulse triggers) such that transmitter 904 transmits ranging pulses of a pulse group having the determined inter-pulse interval.

As another non-limiting example, timer 902 may determine an arrangement of different types of pulses in pulse groups of broadcast cycles, e.g., according to a pulse-ordering scheme, e.g., as described above with regard to FIG. 2. Timer 902 may provide instructions (e.g., template numbers) such that transmitter 904 transmits ranging pulses arranged in pulse groups of broadcast cycles according to the determined arrangement.

As another non-limiting example, timer 902 may calculate dither, e.g., according to a dithering schedule, e.g., as described above with regard to FIG. 3-FIG. 7. Timer 902 may provide instructions (e.g., pulse triggers) such that transmitter 904 transmits pulse groups advanced or delayed (e.g., dithered) according to the calculated dither.

As another non-limiting example, timer 902 may determine a phase encoding for phases of pulses of pulse groups of broadcast cycles, e.g., according to a pulse-phase-signature schedule, e.g., as described above with regard to FIGS. 8A-8C. Timer 902 may provide phase instructions such that transmitter 904 transmits pulses having phases according to the determined phase encoding.

Figure 10:
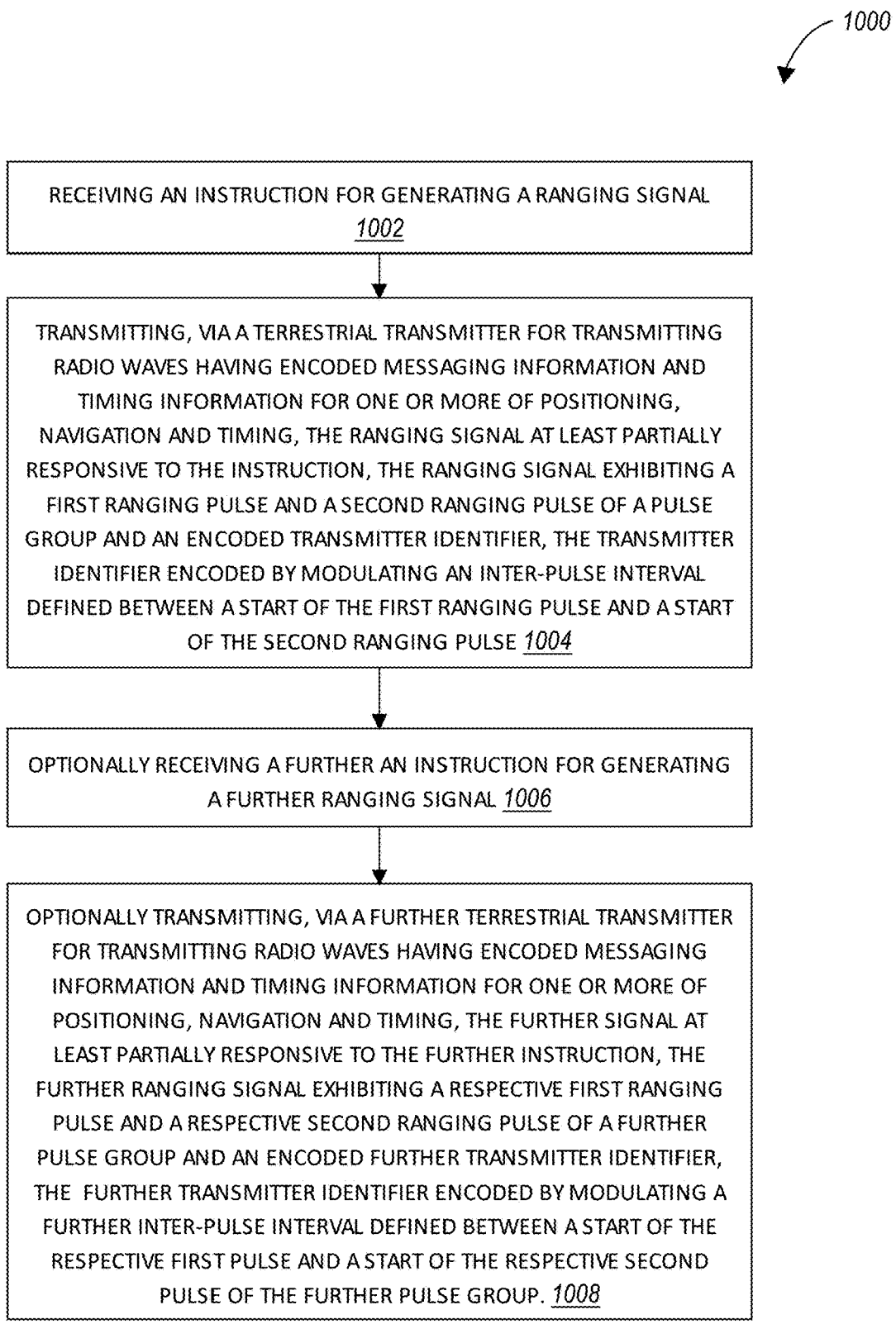
FIG. 10 is a flowchart illustrating a method for broadcasting radio waves (e.g., radio frequency groundwaves) according to one or more examples.

FIG. 10 is a flowchart illustrating a process 1000 for broadcasting radio waves according to one or more examples. In particular, process 1000 may be for broadcasting radio waves by a terrestrial transmitter, the radio waves encoding messaging information and timing information for one or more of positioning, navigation, and timing, and may be performed by system 900.

At operation 1002, process 1000 receives instructions for generating a ranging signal.

At operation 1004, process 1000 transmits the ranging signal at least partially responsive to the instructions. In various examples, that ranging signal may be transmitted via a terrestrial transmitter for transmitting radio waves having encoded messaging information and timing information for one or more of positioning, navigation and timing.

The ranging signal may exhibit a first ranging pulse and a second ranging pulse of a pulse group (e.g., P1 and P2 of pulse group 152 of FIG. 1B, without limitation) and a transmitter identifier. The transmitter identifier may be encoded by modulating an inter-pulse interval (e.g., inter-pulse interval 128 of FIG. 1B, without limitation) defined between a start of the first pulse and a start of the second pulse.

At optional operation 1006, process 1000 receives further instructions for generating a further ranging signal.

At optional operation 1008, process 1000 optionally transmits the further ranging signal at least partially responsive to the further instruction. In various examples, process 1000 transmits the further ranging signal via a further terrestrial transmitter for transmitting radio waves having encoded messaging information and timing information for one or more of positioning, navigation and timing. In various examples, the further ranging signal exhibits a respective first ranging pulse and a respective second ranging pulse of a further pulse group and a further transmitter identifier encoded by modulating a further inter-pulse interval defined between a start of the respective first ranging pulse and a start of the respective second ranging pulse of the further pulse group.

Figure 11:
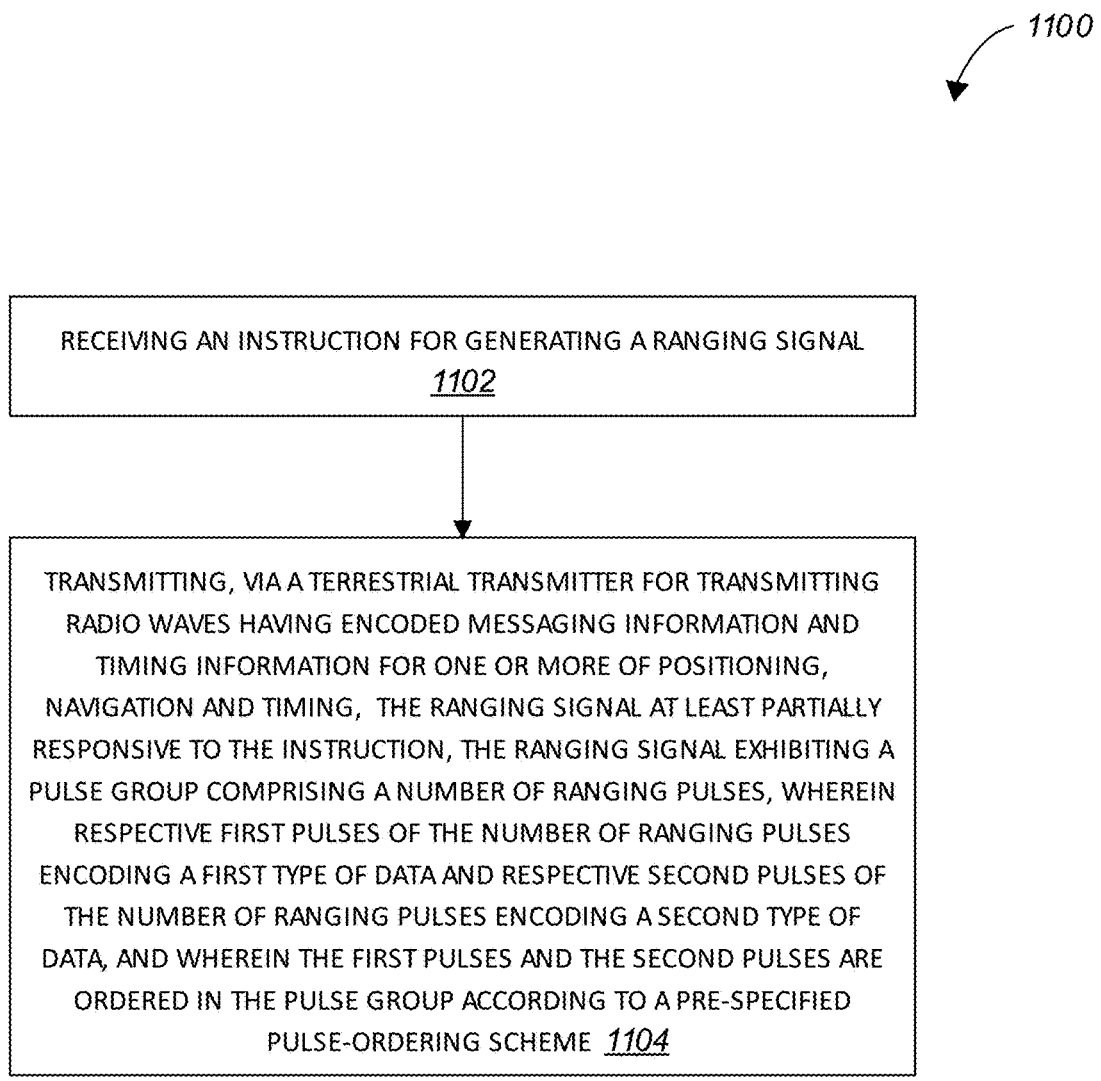
FIG. 11 is a flowchart illustrating a method for broadcasting radio waves (e.g., radio frequency groundwaves) according to one or more examples.

FIG. 11 is a flowchart illustrating a process 1100 for broadcasting radio waves according to one or more examples. In particular, process 1100 may be for broadcasting radio waves by a terrestrial transmitter, the radio waves encoding messaging information and timing information for one or more of positioning, navigation, and timing, and may be performed by system 900.

At operation 1102, process 1100 receives an instruction for generating a ranging signal.

At operation 1104, process 1100 transmits the ranging signal at least partially responsive to the instruction. In various examples, process 1100 transmits the ranging signal via a terrestrial transmitter for transmitting radio waves having encoded messaging information and timing information for one or more of positioning, navigation and timing. In various examples, a pulse group may comprise a number of ranging pulses may be transmitted. First ranging pulses of the number of pulses may encode a first type of data (e.g., time-message pulses of FIG. 2, without limitation) and second ranging pulses of the number of pulses may encode a second type of data (e.g., data-message pulses of FIG. 2, without limitation). The first ranging pulses and second ranging pulses may be ordered in the pulse group according to a pre-specified pulse-ordering scheme (e.g., pulse-ordering scheme 200, without limitation).

Figure 12:
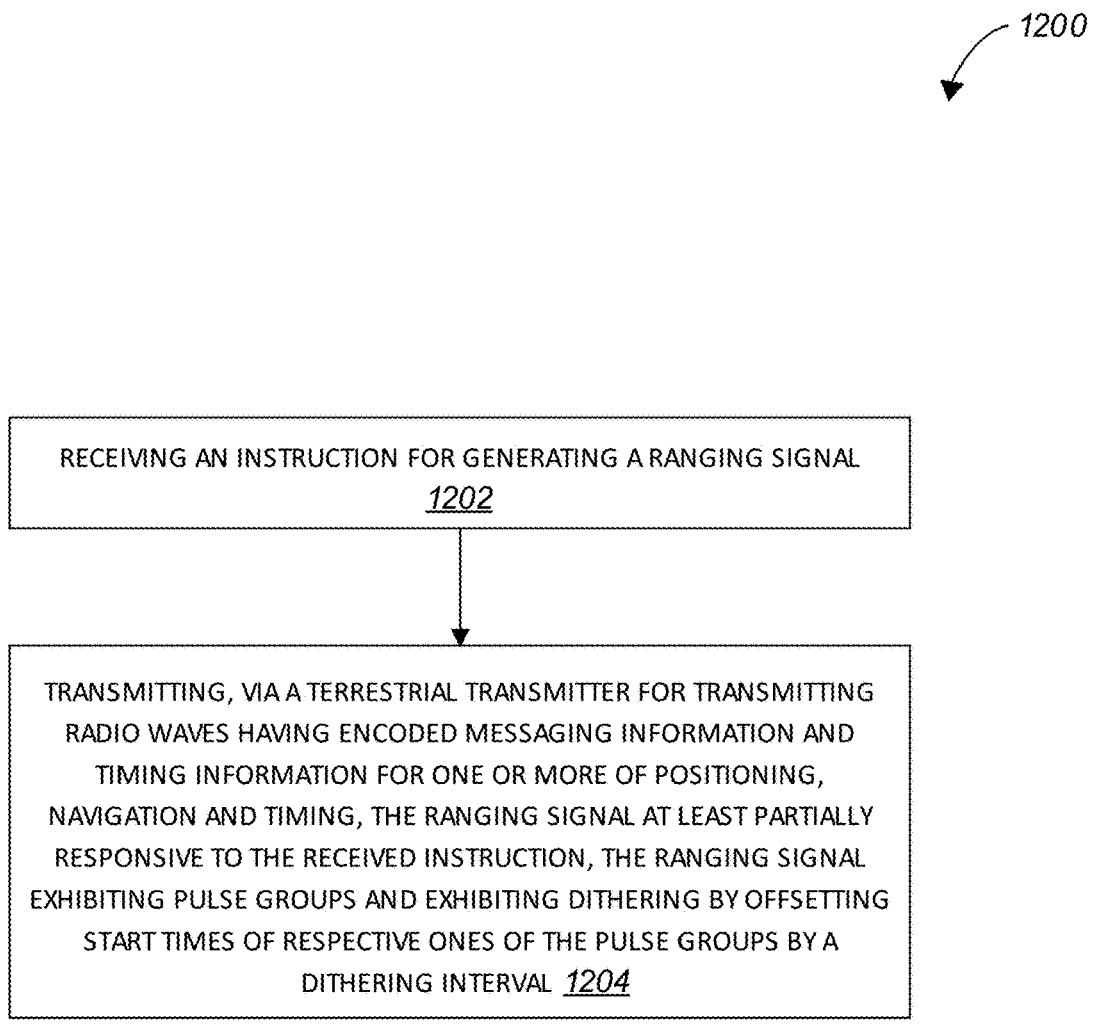
FIG. 12 is a flowchart illustrating a method for broadcasting radio waves (e.g., radio frequency groundwaves) according to one or more examples.

FIG. 12 is a flowchart illustrating a process 1200 for broadcasting radio waves according to one or more examples. In particular, process 1200 may be for broadcasting radio waves by a terrestrial transmitter, the radio waves encoding messaging information and timing information for one or more of positioning, navigation, and timing, and may be performed by system 900.

At operation 1202, process 1200 receives an instruction for generating a ranging signal.

At operation 1204, process 1200 transmits the ranging signal at least partially responsive to the instructions. In various examples, process 1200 may transmit the ranging signal via a terrestrial transmitter for transmitting radio waves having encoded messaging information and timing information for one or more of positioning, navigation and timing.

In various examples, the ranging signal may be a ranging signal exhibiting pulse groups and dithering. In various examples, dithering may be exhibited by offsetting start times of all of respective pulse groups of the ranging signal by a dithering interval (e.g., chain-level dithering, e.g., as described with regard to FIG. 4 or station-level dithering, e.g., as described with regard to FIG. 5, FIG. 6 and FIG. 7 without limitation).

FIG. 13 is a flowchart illustrating a process 1300 for broadcasting radio waves according to one or more examples. In particular, process 1300 may be for broadcasting radio waves by a terrestrial transmitter, the radio waves encoding messaging information and timing information for one or more of positioning, navigation, and timing, and may be performed by system 900.

At operation 1302, during a broadcast cycle of a terrestrial transmitter for transmitting radio waves having encoded messaging information and timing information for one or more of positioning, navigation and timing, process 1300 transmits, via the terrestrial transmitter, pulse groups of the broadcast cycle. Respective pulse groups of the broadcast cycle may include a number of ranging pulses. Each of the number of ranging pulses may have either a positive-going phase (e.g., as does positive-phase-code pulse 802 of FIGS. 8A-8C, without limitation) or a negative-going phase (e.g., as does negative-phase-code pulse 808 of FIGS. 8A-8C, without limitation). The phases of all of the number of pulses of the respective pulse groups may be according to a pulse-phase signature (e.g., as does pulse group 800 of FIGS. 8A-8C, without limitation). The pulse-phase signature may be predefined for the broadcast cycle and the transmitter.

As used in the present disclosure, the terms "module" or "component" may refer to specific hardware implementations configured to perform the actions of the module or component or software objects or software routines that may be stored on or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means some or a totality. As used herein, "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: A method, comprising: receiving an instruction for generating a ranging signal; and transmitting, via a terrestrial transmitter for transmitting radio waves having encoded messaging information and timing information for one or more of positioning, navigation and timing, the ranging signal at least partially responsive to the instruction, the ranging signal exhibiting a first ranging pulse and a second ranging pulse of a pulse group and an encoded transmitter identifier, the transmitter identifier encoded by modulating an inter-pulse interval defined between a start of the first ranging pulse and a start of the second ranging pulse.

Example 2: The method according to Example 1, comprising: receiving a further instruction for generating a further ranging signal; and transmitting, via a further terrestrial transmitter for transmitting radio waves having encoded messaging information and timing information for one or more of positioning, navigation and timing, the further ranging signal at least partially responsive to the further instruction, the further ranging signal exhibiting a respective first ranging pulse and a respective second ranging pulse of a further pulse group and an encoded further transmitter identifier, the further transmitter identifier encoded by modulating a further inter-pulse interval defined between a start of the respective first pulse and a start of the respective second pulse of the further pulse group.

Example 3: A method, comprising: receiving an instruction for generating a ranging signal; and transmitting, via a terrestrial transmitter for transmitting radio waves having encoded messaging information and timing information for one or more of positioning, navigation and timing, the ranging signal at least partially responsive to the instruction, the ranging signal exhibiting a pulse group comprising a number of ranging pulses, wherein respective first pulses of the number of ranging pulses encoding a first type of data and respective second pulses of the number of ranging pulses encoding a second type of data, and wherein the respective first pulses and the respective second pulses are ordered in the pulse group according to a pre-specified pulse-ordering scheme.

Example 4: The method according to Example 3, wherein: the pulse group comprises template pulses and the template pulses are ordered in the pulse group according to the pre-specified pulse-ordering scheme.

Example 5: The method according to any of Examples 3 and 4, wherein the template pulses are different than the respective first pulses that encode the first type of data and the respective second pulses that encode the second type of data.

Example 6: The method according to any of Examples 3 through 5, wherein the respective first pulses encode timing information and the respective second pulses encode a message.

Example 7: The method according to any of Examples 3 through 6, wherein the second type of data is encrypted prior to being encoded in the respective first pulses.

Example 8: The method according to any of Examples 3 through 7, wherein the first type of data comprises timing information and the second type of data comprises a message.

Example 9: The method according to any of Examples 3 through 8, wherein the message includes additional timing information.

Example 10: A method, comprising: receiving an instruction for generating a ranging signal; and transmitting, via a terrestrial transmitter for transmitting radio waves having encoded messaging information and timing information for one or more of positioning, navigation and timing, the ranging signal at least partially responsive to the received instruction, the ranging signal exhibiting pulse groups and exhibiting dithering by offsetting start times of respective ones of the pulse groups by a dithering interval.

Example 11: The method according to Example 10, comprising: receiving a further instruction for generating a further ranging signal; and transmitting, via a further terrestrial transmitter, the further ranging signal at least partially responsive to the received further instruction, the further ranging signal exhibiting further pulse groups and exhibiting further dithering by offsetting start times of respective ones of the further pulse groups by a further dithering interval.

Example 12: The method according to any of Examples 10 and 11, wherein the dithering interval and the further dithering interval are station-level dithering.

Example 13: The method according to any of Examples 10 through 12, wherein the dithering interval and the further dithering interval are chain-level dithering.

Example 14: The method according to any of Examples 10 through 13, wherein the dithering interval and the further dithering interval are masked dithering.

Example 15: A method comprising: during a broadcast cycle of a terrestrial transmitter for transmitting radio waves having encoded messaging information and timing information for one or more of positioning, navigation and timing, transmitting pulse groups of the broadcast cycle, via the terrestrial transmitter, respective ones of the pulse groups including a number of ranging pulses, respective ones of the number of ranging pulses having a phase of either a positive-going phase or a negative-going phase, wherein the phases of the respective ones of the number of ranging pulses of the respective pulse group are according to a pulse-phase signature and the pulse-phase signature is predefined for the broadcast cycle and the terrestrial transmitter.

Example 16: The method according to Example 15, wherein the pulse-phase signature comprises an indication of the phase of each of the number of ranging pulses.

Example 17: The method according to any of Examples 15 and 16, wherein the pulse-phase signature is according to a pre-defined pulse-phase-signature schedule comprising a pulse-phase signature for a number of broadcast cycles.

Example 18: An apparatus, comprising: a transmitter to transmit radio waves having encoded messaging information and timing information for one or more of positioning, navigation and timing; and the transmitter and the a timer coupled to transmit a ranging signal, the ranging signal at least partially responsive to the instruction, the ranging signal exhibiting a first ranging pulse and a second ranging pulse of a pulse group and an encoded transmitter identifier, the transmitter identifier encoded by modulating an inter-pulse interval defined between a start of the first ranging pulse and a start of the second ranging pulse.

Example 19: An apparatus, comprising: a transmitter to transmit radio waves having encoded messaging information and timing information for one or more of positioning, navigation and timing; and the transmitter and the a timer coupled to transmit a ranging signal, the ranging signal exhibiting a pulse group comprising a number of ranging pulses, wherein respective first pulses of the number of ranging pulses encoding a first type of data and respective second pulses of the number of ranging pulses encoding a second type of data, and wherein the first pulses and the second pulses are ordered in the pulse group according to a pre-specified pulse-ordering scheme.

Example 20: An apparatus, comprising: a transmitter to transmit radio waves having encoded messaging information and timing information for one or more of positioning, navigation and timing; and the transmitter and the a timer coupled to transmit a ranging signal, the ranging signal exhibiting pulse groups and exhibiting dithering by offsetting start times of respective ones of the pulse groups by a dithering interval.

Example 21: An apparatus, comprising: a transmitter to transmit radio waves having encoded messaging information and timing information for one or more of positioning, navigation and timing; and the transmitter and the a timer coupled to transmit pulse groups of a broadcast cycle, respective ones of the pulse groups including a number of ranging pulses, respective ones of the number of ranging pulses having a phase of either a positive-going phase or a negative-going phase, wherein the phases of respective ones of the ranging pulses of the respective pulse group are according to a pulse-phase signature and the pulse-phase signature is predefined for the broadcast cycle and the terrestrial transmitter.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method, comprising:
   receiving an instruction for generating a ranging signal; and
   transmitting, via a terrestrial transmitter for transmitting radio waves having encoded messaging information and timing information for one or more of positioning, navigation and timing, the ranging signal at least partially responsive to the instruction, the ranging signal exhibiting a pulse group comprising:
      a number of ranging pulses, wherein respective first pulses of the number of ranging pulses encoding a first type of data and respective second pulses of the number of ranging pulses encoding a second type of data, and wherein the respective first pulses and the respective second pulses are ordered in the pulse group according to a pre-specified pulse-ordering scheme; and
      a number of template pulses and the template pulses are ordered in the pulse group according to the pre-specified pulse-ordering scheme, wherein the template pulses are different than the respective first pulses that encode the first type of data and the respective second pulses that encode the second type of data.

2. The method of claim 1, wherein the respective first pulses encode timing information and the respective second pulses encode a message.

3. The method of claim 1, wherein the second type of data is encrypted prior to being encoded in the respective first pulses.

4. The method of claim 3, wherein the first type of data comprises timing information and the second type of data comprises a message.

5. The method of claim 4, wherein the message includes additional timing information.

6. An apparatus, comprising:
   a timer; and
   a transmitter to transmit radio waves having encoded messaging information and timing information for one or more of positioning, navigation and timing; wherein the transmitter and the timer are coupled to transmit a ranging signal, the ranging signal exhibiting a pulse group comprising:
      a number of ranging pulses, wherein respective first pulses of the number of ranging pulses encoding a first type of data and respective second pulses of the number of ranging pulses encoding a second type of data, and wherein the first pulses and the second pulses are ordered in the pulse group according to a pre-specified pulse-ordering scheme; and
      a number of template pulses and the template pulses are ordered in the pulse group according to the pre-specified pulse-ordering scheme, wherein the template pulses are different than the respective first pulses that encode the first type of data and the respective second pulses that encode the second type of data.

7. The apparatus of claim 6, wherein the respective first pulses encode timing information and the respective second pulses encode a message.

8. The apparatus of claim 6, wherein the second type of data is encrypted prior to being encoded in the respective first pulses.

9. The apparatus of claim 8, wherein the first type of data comprises timing information and the second type of data comprises a message.

10. The apparatus of claim 9, wherein the message includes additional timing information.

* * * * *